US012726993B2

(12) United States Patent
Elshafie et al.

(10) Patent No.: US 12,726,993 B2
(45) Date of Patent: Sep. 1, 2026

(54) TRANSMISSION CONFIGURATION FOR USER EQUIPMENT (UE)

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 18/061,349

(22) Filed: Dec. 2, 2022

(65) Prior Publication Data

US 2024/0188090 A1 Jun. 6, 2024

(51) Int. Cl.

*H04W 72/23* (2023.01)
*H04W 72/12* (2023.01)
*H04W 76/28* (2018.01)

(52) U.S. Cl.

CPC ........... *H04W 72/23* (2023.01); *H04W 72/12* (2013.01); *H04W 76/28* (2018.02)

(58) Field of Classification Search

CPC ...... H04W 72/12; H04W 72/23; H04W 76/28
See application file for complete search history.

(56) References Cited

U.S. PATENT DOCUMENTS

2007/0124425 A1 5/2007 Gross
2021/0037552 A1* 2/2021 Chen ..................... H04W 72/23
2021/0084624 A1* 3/2021 Zhou ................. H04W 72/0446
2021/0160879 A1* 5/2021 Lin ................... H04W 72/0453
2022/0030620 A1* 1/2022 Cirik ..................... H04W 16/28
2022/0132517 A1* 4/2022 Zhu ....................... H04L 5/0051
2023/0147122 A1* 5/2023 Canonne-Velasquez .................... H04L 5/005 370/329
2023/0336628 A1* 10/2023 Xu .................... H04W 52/0235
2024/0214137 A1* 6/2024 Canonne-Velasquez .................... H04L 1/08
2024/0430068 A1* 12/2024 Khoshnevisan .. H04W 72/0446

* cited by examiner

*Primary Examiner* — Eric Nowlin

(74) *Attorney, Agent, or Firm* — Norton Rose Fulbright US LLP

(57) ABSTRACT

This disclosure provides systems, methods, and devices for wireless communication that support a scheduling request configuration. In a first aspect, a method of wireless communication receiving a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The method also includes initiating at least one transmission of the first set of transmissions based on the first transmission configuration indicator. Other aspects and features are also claimed and described.

30 Claims, 12 Drawing Sheets

1000

1002

Establish a communication session with a network entity

1004

Receive a first scheduling request configuration indicator for the communication session, the first scheduling request configuration indicator indicating a first configuration of a first set of scheduling requests, the first configuration including a first periodicity of first scheduling requests of the first set of scheduling requests, and a first repetition interval for the first set of scheduling requests

FIGURE 10

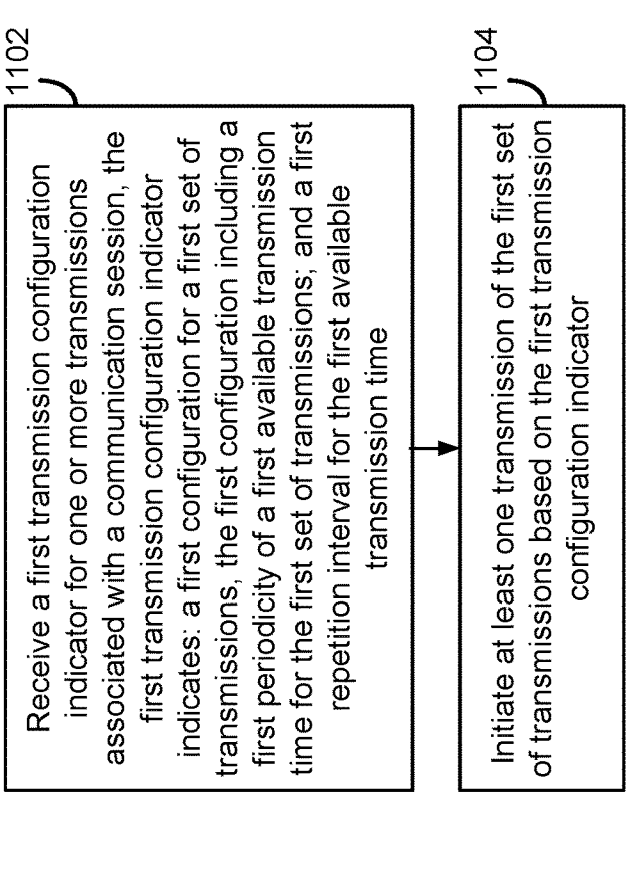

FIGURE 11

TRANSMISSION CONFIGURATION FOR USER EQUIPMENT (UE)

TECHNICAL FIELD

Aspects of the present disclosure relate generally to wireless communication systems, and more particularly, to a transmission configuration. The communication session may include traffic, such as extended reality (XR) traffic. Some features may enable and provide improved communications, including reduced control overhead, efficient resource utilization, improved network access, higher data rates, increased traffic capacity, increased spectral efficiency, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Advances in wireless technologies and wireless communication networks have provided a variety of time sensitive communication capabilities, such as 5G technology and 5G networks, which have demand requirements of high reliability and low latency. The time sensitive communication capabilities may be applicable to a wide range of application areas, such as real-time media, industrial control, remote control, and mobility automation, as illustrative, non-limiting example. Real-time media may include extended reality (XR) applications which may an array of technologies including virtual reality (VR), mixed reality (MR), augmented reality (AR), and haptics, as illustrative, non-limiting examples. XR traffic may include a burst, such as a burst of a set of data packets (e.g., IP data packets). For example, the burst may include one or more (e.g., all) slices of a video frame. To illustrate, uplink (UL) XR traffic may include UL video burst traffic in which packets (corresponding to different video frames) are communicated at a frame rate of 60 frames-per-second (fps)—e.g., every 16.67 msec.

Although emerging technologies, such as 5G, show promise for being able to be leveraged for XR applications, additional research and development related to integration of wireless communication networks and XR applications and device, such as a head-mounted display (HMD) is needed. For example, additional research and development may be associated with XR-awareness in wireless communication networks, such as XR traffic (both uplink (UL) and downlink (DL)) characteristics, Quality of Service (QOS) metrics, and application layer attributes for a gNB to be aware of to aid XR-specific traffic handling. As another example, additional research and development may be associated with XR-specific power savings, such as XR specific power saving techniques to accommodate XR service characteristics (periodicity, multiple flows, jitter, latency, reliability, etc.). To illustrate, the techniques may be associated with connected mode discontinuous reception (C-DRX) enhancement or physical downlink control channel (PDCCH), as illustrative, non-limiting examples. Additional research and development may be associated with XR-specific capacity improvements.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes receiving a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The method further includes initiating at least one transmission of the first set of transmissions based on the first transmission configuration indicator.

In an additional aspect of the disclosure, an apparatus includes at least one processor and a memory coupled to the at least one processor. The at least one processor is configured to receive a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The at least one processor is further configured to initiate at least one transmission of the first set of transmissions based on the first transmission configuration indicator.

In an additional aspect of the disclosure, an apparatus includes a communication interface configured to receive a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The apparatus further includes at least one processor coupled to a memory storing processor-readable code, the at least one processor configured to execute the processor-readable code to cause the at least one processor to initiate at least one transmission of the first set of transmissions based on the first transmission configuration indicator.

In an additional aspect of the disclosure, an apparatus includes means for receiving a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The apparatus further includes means for transmitting at least one transmission of the first set of transmissions based on the first transmission configuration indicator.

In an additional aspect of the disclosure, a non-transitory computer-readable medium stores instructions that, when executed by a processor, cause the processor to perform operations. The operations include receiving a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The operations further include transmitting at least one transmission of the first set of transmissions based on the first transmission configuration indicator.

In an additional aspect of the disclosure, a method for wireless communication is performed by a network entity. The method includes generating a first transmission configuration indicator for one or more transmissions during a communication session of a UE. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The method also includes transmitting the first transmission configuration indicator.

In an additional aspect of the disclosure, an apparatus includes at least one processor and a memory coupled to the at least one processor. The at least one processor is configured to generate a first transmission configuration indicator for one or more transmissions during a communication session of a UE. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The at least one processor is further configured to transmit the first transmission configuration indicator.

In an additional aspect of the disclosure, an apparatus includes at least one processor coupled to a memory storing processor-readable code, the at least one processor configured to execute the processor-readable code to cause the at least one processor to generate a first transmission configuration indicator for one or more transmissions during a communication session of a UE. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The apparatus further includes a communication interface configured to transmit the first transmission configuration indicator.

In an additional aspect of the disclosure, an apparatus includes means for generating a first transmission configuration indicator for one or more transmissions during a communication session of a UE. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The apparatus further includes means for transmitting the first transmission configuration indicator.

In an additional aspect of the disclosure, a non-transitory computer-readable medium stores instructions that, when executed by a processor, cause the processor to perform operations. The operations include generating a first transmission configuration indicator for one or more transmissions during a communication session of a UE. The first transmission configuration indicator indicates a first configuration for a first set of transmissions. The first configuration includes a first periodicity of a first available transmission time for the first set of transmissions. The first transmission configuration indicator further indicates a first repetition interval for the first available transmission time. The operations further include transmitting the first transmission configuration indicator.

In an additional aspect of the disclosure, a method for wireless communication is performed by a UE. The method includes establishing a communication session with a network entity. The method also includes receiving a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests.

In an additional aspect of the disclosure, an apparatus includes at least one processor and a memory coupled to the at least one processor. The at least one processor is configured to establish a communication session with a network entity. The at least one processor is further configured to receive a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests.

In an additional aspect of the disclosure, an apparatus includes at least one processor coupled to a memory storing processor-readable code, the at least one processor configured to execute the processor-readable code to cause the at least one processor to establish a communication session with a network entity. The apparatus further includes a communication interface configured to receive a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests.

In an additional aspect of the disclosure, an apparatus includes means for establishing a communication session with a network entity. The apparatus further includes means for receiving a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests.

In an additional aspect of the disclosure, a non-transitory computer-readable medium stores instructions that, when executed by a processor, cause the processor to perform operations. The operations include establishing a communication session with a network entity. The operations further include receiving a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests.

In one aspect of the disclosure, a method for wireless communication is performed by a network entity. The method includes generating a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The method further includes transmitting the first scheduling request configuration indicator.

In an additional aspect of the disclosure, an apparatus includes at least one processor and a memory coupled to the at least one processor. The at least one processor is configured to generate a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The at least one processor is further configured to transmitting the first scheduling request configuration indicator.

In an additional aspect of the disclosure, an apparatus includes at least one processor coupled to a memory storing processor-readable code, the at least one processor configured to execute the processor-readable code to cause the at least one processor to generate a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The apparatus further includes a communication interface configured to transmit the first scheduling request configuration indicator.

In an additional aspect of the disclosure, an apparatus includes means for generating a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The apparatus further includes means for transmitting the first scheduling request configuration indicator.

In an additional aspect of the disclosure, a non-transitory computer-readable medium stores instructions that, when executed by a processor, cause the processor to perform operations. The operations include generating a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The operations further include transmitting the first scheduling request configuration indicator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow diagram illustrating an example process that supports a transmission configuration according to one or more aspects.

FIG. 11 is a flow diagram illustrating an example process that supports a transmission configuration according to one or more aspects.

Like reference numbers and designations in the various drawings indicate like elements.

DETAILED DESCRIPTION

Figure 1:
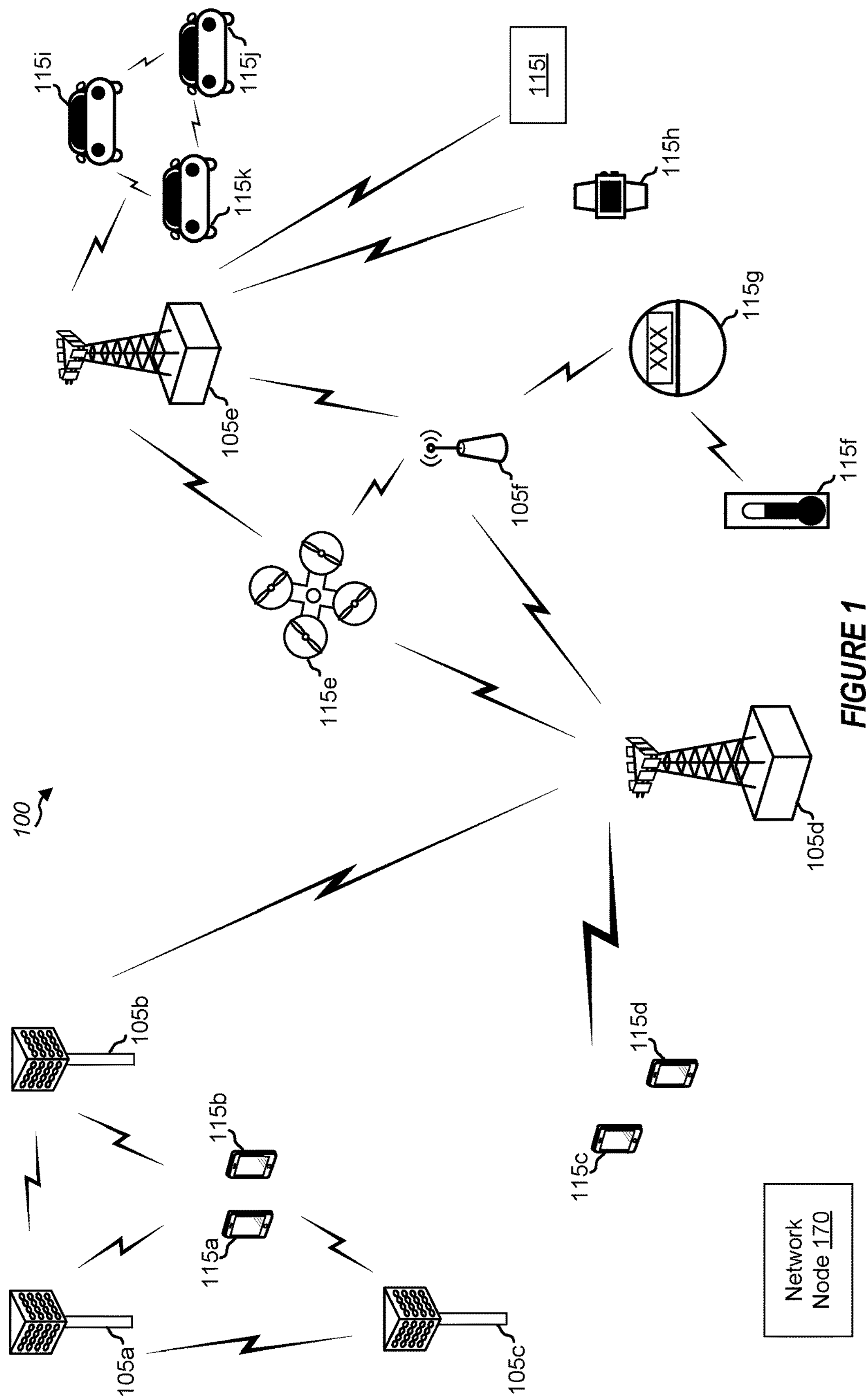
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a transmission configuration. For example, the present disclosure describes a transmission configuration that would enable one or more transmissions by a UE during a communication session. In some implementations, one or more transmissions of the first set of transmissions include a scheduling request (SR), a channel sounding response/information (CSR/CSI) report, a sounding reference signal (SRS), uplink or sidelink configured grant (CG), a dynamic one or more of burst (i.e., set of data) of physical uplink or sidelink shared channel (PUSCH or PSSCH) transmissions, or a hybrid automatic repeat request (HARQ) acknowledgement (ACK). For example, the transmission configuration may be a transmission configuration to enable a burst of scheduling requests during a communication session, such as an include extended reality (XR) communication session which may include one or more bursts of XR traffic. In some other examples, the communication session may include ultra-reliable low-latency (URLLC) traffic. In some implementations, the first set of transmissions include one or more uplink transmissions or one or more sidelink transmissions. Additionally, or alternatively, transmissions of the first set of transmissions may be periodic or aperiodic.

The transmission configuration may include or indicate a first configuration of a first set of transmissions, a first repetition interval for the first set of transmissions, or a combination thereof. The first configuration may include or indicate a first periodicity of a first available transmission time for the first set of transmissions (associated with a first scheduling resource). In some implementations, the first configuration may indicate a second periodicity of a second available transmission time for a second set of transmissions (associated with a second scheduling resource) of the first set of scheduling requests. Additionally, or alternatively, the first repetition interval may indicate a cyclic repetition of a start of the first set of transmissions, or a time period between a last transmission time of a first group of transmissions of the first set of transmissions and an initial transmission time of a second group of transmissions of the first set of transmission. The transmission configuration may be semi-static and may be configured such that, during the communication session, a burst of transmissions may be communicated to support uplink transmissions, such as one or more bursts of XR traffic or an uplink (UL) transmission window. Outside of supporting the uplink transmissions, the transmission configuration may be configured such that, during the communication session, a burst of transmissions is not needed—e.g., infrequent or sparse transmissions, such as a non-burst of transmissions, may be configured or used.

In some implementations, the transmission configuration may be changed or updated over time. For example, downlink control information (DCI) or a medium access control-control element (MAC-CE) may be used to change or update the transmission configuration. To illustrate, a change or an update to the transmission configuration may include, changing the first periodicity, changing a transmission resource, changing the first repetition interval, or a combination thereof, as illustrate, non-limiting examples. Additionally, or alternatively, the first repetition interval may be based on a discontinuous reception (DRX) such that transmission of the first set of transmissions occurs during a DRX on duration. In some implementations, an indicator of the transmission configuration is communicated based on a short DRX cycle or a long DRX cycle. Additionally, or alternatively, a radio resource control (RRC) configuration may include an information element that includes the indicator of the transmission configuration and a DRX cycle configuration indicator.

Particular implementations of the subject matter described in this disclosure may be implemented to realize one or more of the following potential advantages or benefits. In some aspects, the present disclosure provides techniques for supporting a transmission configuration, such as a transmission configuration for a UE. The techniques described herein may reduce control overhead and improve performance by configuring or matching the transmission configuration to traffic (e.g., bursts of XR traffic) of the communication session. The techniques described herein may also enable and provide improved communications, including efficient resource utilization, improved network access, higher data rates, increased traffic capacity, increased spectral efficiency, or a combination thereof.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115*c*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*c*.

Additionally, another machine type device, such as UE 115*l* (a head-mounted display (HMD) or smart glasses), may communicate through wireless network 100 either directly with base stations, such as small cell base station 105*f*, and macro base station 105*e*, or in multi-hop configurations by communicating with another user device which relays its information to the network, such as a smart phone (e.g., 115*c* or 115*d*). In some implementations, UE 115*l* may be configured to execute an application, such as an XR application or another type of application, and may communicate with a network node 170, such as a server, an edge component, or cloud component (e.g., an edge of a cloud), of network 100. Network node 170 may include an application, such as an XR application associated with the XR application of UE 115*l*. UE 115*l* may be configured to communicate with network node 170 via one or more base stations 105. For example, in some implementations, UE 115*l* may be configured to communicate directly with a base station 105.

Figure 2:
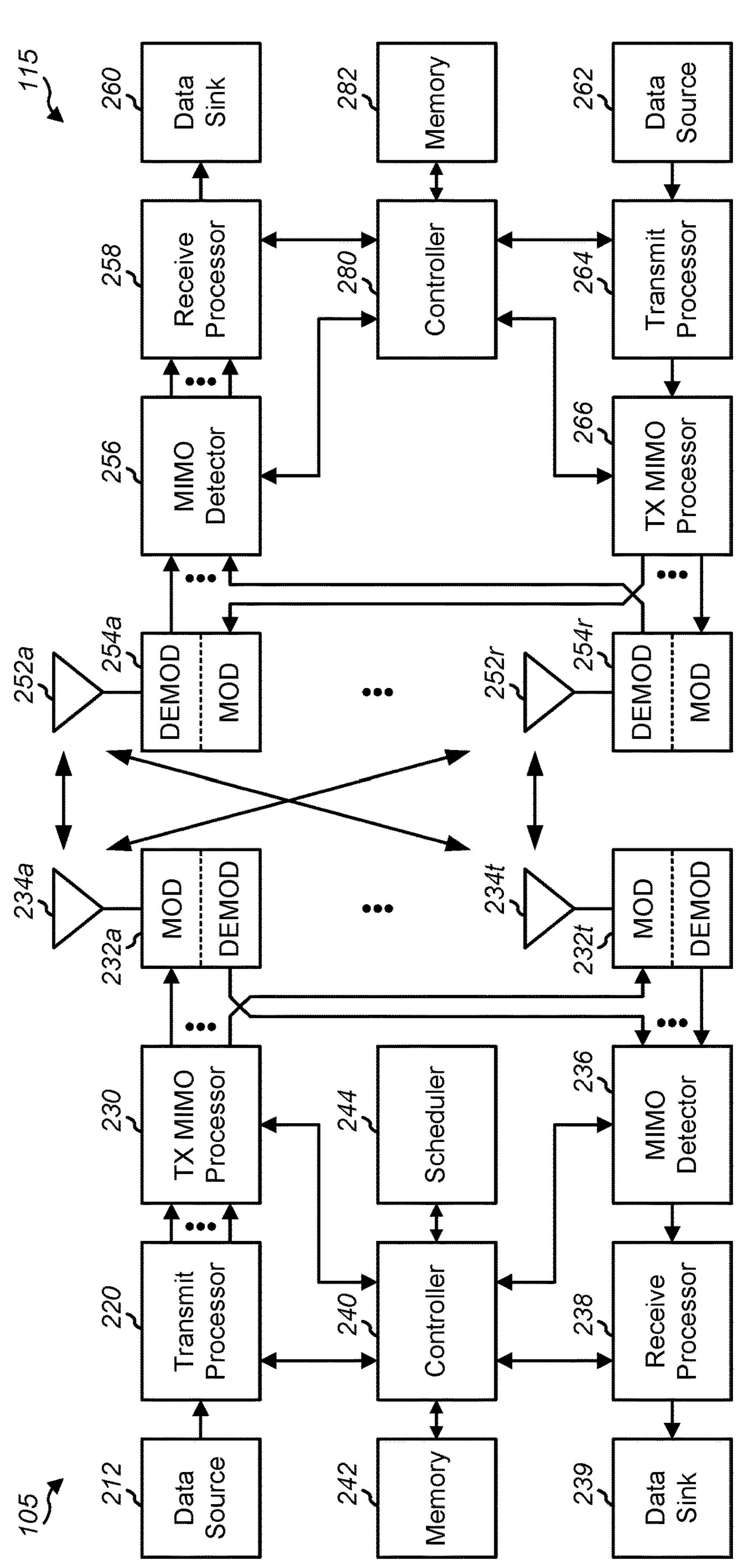
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 10, 11, 13, and 14, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
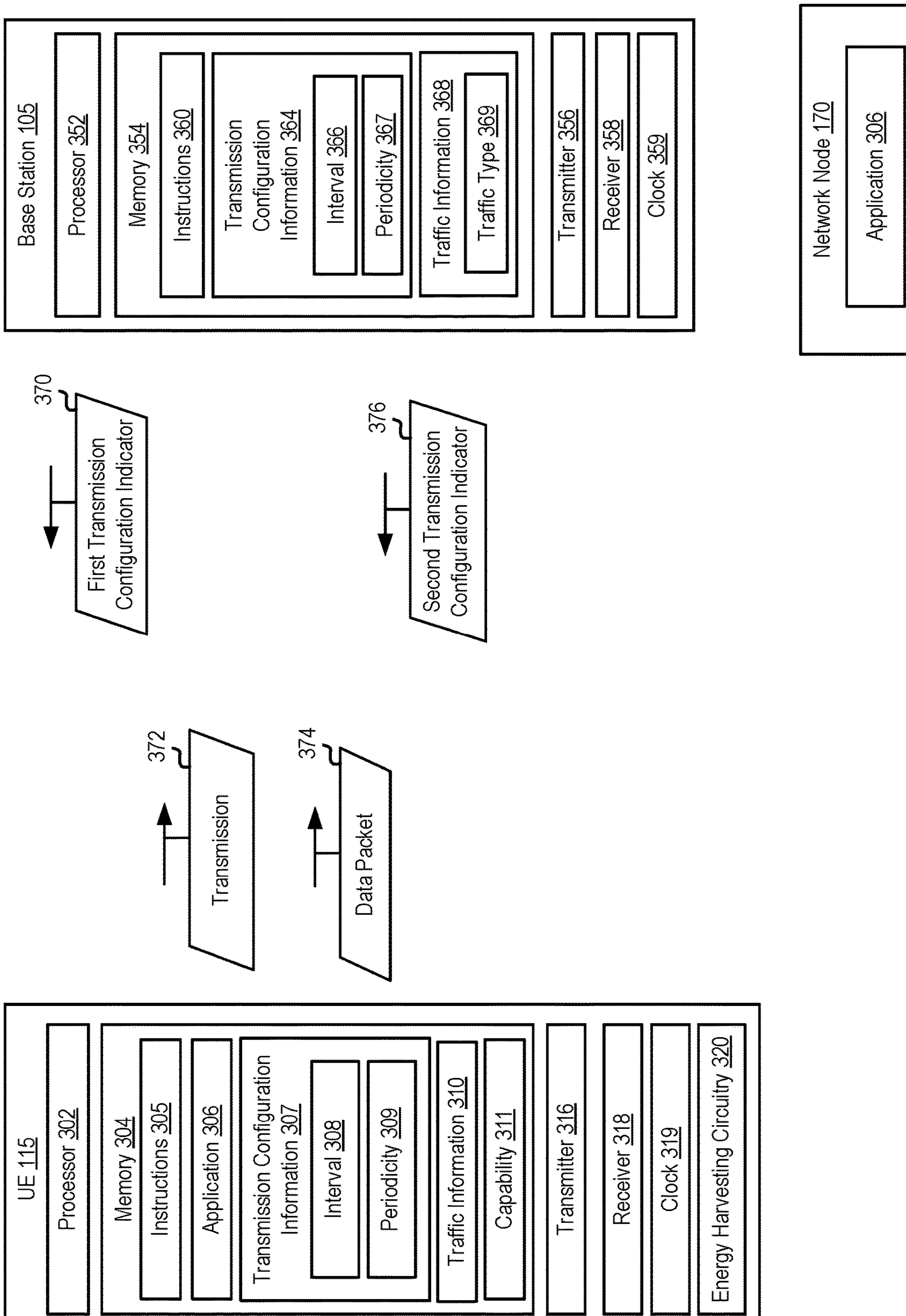
FIG. 3 is a block diagram illustrating an example wireless communication system that supports a transmission configuration according to one or more aspects.

FIG. 3 is a block diagram of an example wireless communications network 300 that supports a transmission configuration according to one or more aspects. In some implementations, the transmission configuration is described as a transmission configuration; however, such description is not intended to be limiting. Additionally, or alternatively, the transmission configuration may include or be associated with a communication session, such as an XR communication session. In some examples, wireless communications network 300 may implement aspects of wireless network 100. Wireless communications network 300 includes UE 115, base station 105, and network node 170 (e.g., a network entity or network device). Although one UE 115, one base station 105, and one network node 170 are illustrated, in some other implementations, wireless communications network 300 may generally include multiple UEs 115, multiple base stations 105, multiple network nodes 170, or a combination thereof. In some implementations, UE 115 may include a head-mounted display (HMD) or smart glasses. Additionally, or alternatively, although one or more operations or communications are described between UE 115 and base station 105, in other implementations, such operations or communications may occur between UE 115 and a network entity, such as another UE when the communication session is a sidelink communication session.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), a clock 319, and energy harvesting circuitry 320.

In some implementations, UE 115 may include an interface (e.g., a communication interface) that includes transmitter 316, receiver 318, one or more radios, or a combination thereof. The interface may enable UE 115 to communicate with another device, such as another UE, a base station, a network entity or network unit, or a combination thereof. In some implementations, the interface may include a first radio and a second radio. The first radio may include a Uu interface for a Uu link, a sidelink interface (e.g., PC5 interface) for sidelink communication, another interface (e.g., a new interface) for a link (e.g., a new link or a new link protocol), or a combination thereof. The Uu interface may be configured to communicate or enable communication of a data physical (PHY) channel (e.g., physical uplink shared channel (PUSCH)), uplink control information (UCI), downlink control information (DCI), or a combination thereof, as illustrative, non-limiting examples. The sidelink interface may be configured to communicate or enable communication of a data PHY channel (e.g., physical sidelink shared channel (PSSCH)), sidelink control information (SCI), or a combination thereof, as illustrative, non-limiting examples. In some implementations, the other interface is distinct from a Uu interface and a sidelink interface. Additionally, or alternatively, the other interface may be configured to communicate or enable communication of scheduling request (SR), buffer status report (BSR), uplink or sidelink configured grant (CG), hybrid automatic repeat request acknowledgment (HARQ ACK), a random access channel (RACH) message, power headroom report (PHR), sounding reference signal (SRS), physical uplink shared channel (PUSCH), channel state information (CSI), uplink control information (UCI), downlink control information (DCI), medium access control-control element (MAC-CE), radio resource control (RRC), user assistance information (UAI), PSSCH, SCI, a Layer 1 (L1) indication, a Layer 2 (L2) indication, a Layer 3 (L3) indication, or a combination thereof. The second radio may include a zero power-Internet-of-Things (ZP-IoT) radio or device or a passive (P)-IoT radio or device. Additionally, or alternatively, the second radio may be configured to communicate or enable communication of an energy signal, a data signal, or a combination thereof. In some implementations, a data signal may be used for energy harvesting, data communication, or both. Additionally, or alternatively, the second radio may be configured to be activated to enable energy harvesting during at least one of an RRC idle state, RRC inactive, RRC connected mode, RRC sleep mode, a power saving mode, or a sleep mode, as illustrative, non-limiting examples. The first radio and the second radio may be used concurrently or not concurrently. For example, UE 115 may use the first radio and not the second radio, use the second radio and not the first radio, use both the first radio and the second radio, or use neither of the first radio and the second radio.

Processor 302 may be configured to execute instructions 305 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 305, application 306, and transmission configuration information 307, traffic information 310, and a capability 311. Application 306 may include software, such as an XR application. In some implementations, the XR application may include a VR application, an MR application, or an AR application, as illustrate, non-limiting examples.

Transmission configuration information 307 may include or indicate a transmission configuration of UE 115, such as a transmission configuration (e.g., a scheduling request configuration) associated with a communication session of UE 115. The transmission configuration may indicate one or more available transmission times for UE 115 to transmit. Transmission configuration information 307 may include or indicate an interval 308, a periodicity 309, or a combination thereof.

The transmission configuration may include or correspond to a set of transmissions, such one or more transmissions. Each transmission of the set of transmissions may include or be associated with a periodicity (e.g., 309). Additionally, or alternatively, each transmission of the set of transmissions may be associated with a transmission resource. The set of transmissions may be communicated (e.g., transmitted by UE 115) as a burst of transmissions. Additionally, or alternatively, the set of transmissions (e.g., the burst of transmissions) may be transmitted during a transmission period, such as a transmission time period having a duration that is determined based on or indicated by the transmission configuration. In some implementations, UE 115 may be configured to communicate the set of transmissions based on an interval (e.g. 308). To illustrate, communication of the set of transmissions may be cyclic. In some implementations, the transmission configuration may be semi-static.

In some implementations, interval 308 indicate a time period or a duration of a time period. Interval 308 may indicate a time period between a last transmission time of a first group of transmissions of the first set of transmissions and an initial transmission time of a second group of transmissions of the first set of transmission. Alternatively, interval 308 may indicate a cyclic repetition of a start of the set of transmissions. Periodicity 309 may indicate a period of a transmission of the set of transmissions. In some implementations, transmission configuration information 307 may indicate a duration of a transmission time period during with the set of transmissions is transmitted. Additionally, or alternatively, transmission configuration information 307 may indicate a number of transmissions of the set of transmissions to be transmitted during the transmission time period.

In some implementations, the transmission configuration is a scheduling request configuration. The scheduling request configuration may include or correspond to a set of scheduling requests, such one or more scheduling requests. Each scheduling request of the set of scheduling requests may include or be associated with a periodicity (e.g., 309). Additionally, or alternatively, each scheduling request of the set of scheduling requests may be associated with a scheduling resource. The set of scheduling requests may be communicated (e.g., transmitted by UE 115) as a burst of scheduling requests. Additionally, or alternatively, the set of scheduling requests (e.g., the burst of scheduling requests) may be transmitted during a scheduling request transmission period, such as a scheduling request transmission time period having a duration that is determined based on or indicated by the scheduling request configuration. In some implementations, UE 115 may be configured to communicate the set of scheduling requests based on an interval (e.g. 308). To illustrate, communication of the set of scheduling requests may be cyclic. In some implementations, the scheduling request configuration may be semi-static.

In some implementations, interval 308 indicate a time period or a duration of a time period. Interval 308 may indicate a time period between a last transmission time of a first group of scheduling requests of the first set of scheduling requests and an initial transmission time of a second group of scheduling requests of the first set of scheduling requests. Alternatively, interval 308 may indicate a cyclic repetition of a start of the set of scheduling request. Periodicity 309 may indicate a period of a scheduling request of the set of scheduling requests. In some implementations, transmission configuration information 307 may indicate a duration of a scheduling request time period during with the set of scheduling requests is transmitted. Additionally, or alternatively, transmission information 307 may indicate a number of scheduling request of the set of scheduling requests to be transmitted during the scheduling request time period.

Traffic information 310 may include or indicate information about a set of transmissions, such as a set of transmissions during a communication session. For example, traffic information may include or indicate a start time for the set of transmissions (e.g., a start of a traffic session or a traffic portion of the communication session), a transmission time period associated with the first set of transmissions (e.g., an initial start time, a time period, an end time, etc.), a transmission size (e.g., an amount of data or a number of transmissions) associated with the set of transmissions, an end time for the first of transmissions, an extension from the end time for the set of transmissions (e.g., a time period that traffic is expected to extend past an end time), a traffic type of traffic of the communication session, a start time of the traffic, an expected time period of the traffic, an end time for the traffic, and extension from the end time for the traffic, or a combination thereof. The traffic type may include or indicate XR, VR, MR, or AR, as illustrate, non-limiting examples. In some implementations, the set of transmissions include a scheduling request (SR), a channel sounding response (CSR) report, a channel sounding information (CSI) report, a sounding reference signal (SRS), uplink or sidelink configured grant (CG), one or more bursts of data transmissions (e.g., physical uplink shared channel (PUSCH) transmissions or physical sidelink shared channel (PSSCH) transmissions), or a hybrid automatic repeat request (HARQ) acknowledgement (ACK). For example, the set of transmission may include a scheduling request or a sounding reference signal. Additionally, alternatively, the set of transmissions may include one or more uplink transmissions or one or more sidelink transmissions. Transmissions of the set of transmission may be periodic or aperiodic.

Capability 311 may include or indicate a capability of UE 115. For example, the capability may be a device type, an energy harvesting capability of the UE, or a combination thereof.

The device type may include or indicate a low power or low capability device type. For example, the device type may include or indicate an energy harvesting device, an IoT device, a zero power (ZP) IoT device, a tag device, a passive device, a semi-passive device, a semi-active, an active device, etc. In some implementations, the device type may indicate that UE 115 is configured to perform energy harvesting using a particular radio, such as the second radio. For example, the particular radio may be an energy harvesting-based radio, a radio of an RFID, PIoT, or ZP IoT that is included in UE 115, or a combination thereof. UE 115 may be configured to use the particular radio to harvest and save power, to operate conserve power during a low power operation mode or state (e.g., an RRC idle mode, a low power mode, or a sleep mode), or a combination thereof. Additionally, or alternatively, UE 115 may be configured to use the particular radio during an ultra-deep sleep mode, based on signaling from the network, based on a determination by UE 115, or a combination thereof. To illustrate, during an RRC idle state, UE may transition into an ultra-low power state and use the particular radio (e.g., a low power or zero power radio) to harvest energy.

The energy harvesting capability includes information (e.g., energy harvesting capability information) associated with energy harvesting circuitry 320, characteristics of energy harvesting circuitry, the device type, or a combination thereof. In some implementations, the energy harvesting capability information includes or indicates a charging rate profile, an energy state profile, an energy discharging rate profile, or a combination thereof. A profile, such as the charging rate profile, the energy state profile, or the energy discharging rate profile may include or indicate a current measurement of some quantity (e.g., a charging rate from one or more technologies or across all technologies), a predicted value across one or more of time intervals/units, or a combination thereof. For example, the charging rate profile, the discharging rate profile, or the energy state profile, may be as small as a single value that represents a current measured rate or energy level/state. In some implementations, the predicted value to be provided by be agreed upon between UE 115 and the network (e.g., base station 105).

Additionally, or alternatively, in some implementations, the energy harvesting capability information includes or indicates energy information associated with an energy harvesting session, an indication of a time period while the energy information is valid, a time period for the energy harvesting session, or a combination thereof. For example, the energy harvesting capability may also include or indicate a start time of the energy information or the energy harvestings session, an expiry/end time of the energy information or the energy harvestings session, a duration, a time instance or time slot, an end time, an extension from the end time, an energy type, an indication of an end of validity or use of the energy information or an end of the energy harvesting session, or a combination thereof. The start time may include or indicate a particular time, an offset with respect to a message or an indicator that indicates the start time, or that the start time correspond to receipt of the message or the indicator. The expiry time may include or indicate a duration or end time that the energy information is valid or that the energy harvesting session occurs. The end time may include or indicate a particular time, a time slot, a frame, or an offset from the start time. Additionally, or alternatively, the end time may indicate when the energy information is no longer valid or the energy harvesting session ends. The extension may indicate additional time past the end period to extend a valid period of the energy information or a duration of the energy harvesting session. The indication of the end of validity or the end of session may specifically indicate that energy information is no longer valid or that an energy harvesting session is ended. The energy type may include or indicate parameters or characteristics of energy harvesting circuitry 320 or UE 115, such as a type of energy to be harvested, a power level of energy to be received, one or more profiles, an energy storage type, an energy storage capacity, a frequency band for energy harvesting, a communication technology for energy harvesting, a radio or type of radio, activation or deactivation of a radio, or a combination thereof. For example, UE 115 may be configured to harvest energy from solar energy, thermal energy, vibration energy, or RF energy. For RF energy harvesting, a received RF signal may be received from a dedicated network device or an undedicated network device, one or more frequency bands, or from one or more wireless communication technologies, such as WiFi, Bluetooth, LTE, LTE/NR sidelink, or TV, as illustrative, non-limiting example.

In some implementations, UE 115 may select a transmission configuration, such as a transmission configuration that includes or indicates interval 308 or periodicity 309. In some implementations, UE 115 is configured to select a transmission configuration from multiple transmission configurations. For example, UE 115 may select the transmission configuration based on traffic information 310, capability 311 (e.g., device type, energy harvesting information, etc.), or a combination thereof.

In some implementations, UE 115 is configured to generate or transmit an indicator or a request. For example, the indicator (or the request) may include or indicate traffic information 310, capability 311 (e.g., device type, energy harvesting information, etc.), or a combination thereof. To illustrate, the indicator may include or indicate energy information, an uplink communication (e.g., SR, CG, CSI, HARQ-ACK, etc.), a preferred configuration, as an illustrative, non-limiting example. Additionally, or alternatively, the indicator (or the request) may include or indicate a transmission configuration selected or preferred by UE 115. In some implementations, UE 115 may transmit the indicator (or the request) on a Layer 1 (L1 indication), a Layer 2 (L2) indication, or a Layer 3 (L3) indication—e.g., UCI, PUSCH, MAC CE, RRC, or user assistance information (UAI)—with configured or dynamic allocated resources. In some other implementations, UE 115 may transmit the indicator (or the request) multiplexed or piggybacked with an L1, L2, or L3 signal—e.g., SR, BSR, HARQ ACK, RACH Msg. PHR, CSI, or a combination thereof.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

In some implementations, UE 115 may include one or more antenna arrays. The one or more antenna arrays may be coupled to transmitter 316, receiver 318, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Clock 319 may include a clock or a timer. Clock 319 may be configured to track or determine one or more time periods or durations. In some implementations, clock 319 (or a time timer) may be dedicated to tracking interval 308, and UE 115 may release, activate, generate, or transmit a set of transmissions, such as a group of a set of transmission, based on clock 319. For example, UE 115 may use clock 319 to track, determine, or identify expiration of one or more intervals (e.g., 308). Additionally, or alternatively, UE 115 may use clock 319 in association with a periodicity (e.g., 309) of transmission (e.g. a scheduling request), DRX operations, or a combination thereof.

Energy harvesting circuitry 320 may include hardware (e.g., circuitry), software, or a combination thereof configured to harvest energy from an energy source for UE 115. For example, the energy source may include a solar energy source, a vibrational energy source, a thermal energy source, or radio frequency (RF), as illustrative, non-limiting examples. In some implementations, the RF may be a dedicated RF from a network, an undedicated RF from a network, or an RF of a frequency band or wireless technology, such as WiFi, Bluetooth, LTE, LTE/NR, sidelink, TV, etc. Energy harvesting circuitry 320 may be coupled to processor 302, memory 304, transmitter 316, receiver 318, a power source of UE 115, a radio (e.g., the second radio), or a combination thereof. In some implementations, the harvested energy may be used to charge a power source, such as a battery or capacitor. The power source may be coupled to processor 302, memory 304, transmitter 316, receiver 318, energy harvesting circuitry 320, or a combination thereof. Additionally, or alternatively, the harvested energy may be configured to power one or more components of UE 115. It is noted that in some implementations, UE 115 may not include a battery.

In some implementations, UE 115 includes a resource, such as a radio resource, configurated for energy harvesting. UE 115 may be configured to perform energy harvesting at one or more times using the resource. For example, UE 115 may perform energy harvesting at the one or more times to save power. Additionally, or alternatively, UE 115 may perform energy harvesting during an ultra-deep sleep mode, at a time to achieve lower power consumption, during certain RRC modes/states, based on an indication from the network, or a combination thereof. For example, during RRC idle, UE 115 can go to an ultra-low power state and use (e.g., activate) the resource. In some implementations, UE 115 may indicate to the network (e.g., base station 105) when UE 115 performs energy harvesting so that the network so that the network can send appropriate communications/signals (e.g., waveforms, modulations, signal configurations (UL or DL)) for the energy harvesting.

In some implementations, UE 115 includes or is a passive device (e.g., a tag device). Additionally, or alternatively, UE 115 may include or be a ZP IoT, a passive IoT, ambient IoT, or an RFID tag with one or more passive or active components.

Tag devices, are categorized based on functionality or capability. For instance, a tag device may be categorized as one of a passive tag, a semi-passive tag, a semi-active tag, and an active tag depending on the functionality or capabilities of the tag device. Accordingly, the tag device may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, a reader or RF source/activating device may transmit an electromagnetic signal that a passive tag may receive and at least partially reflect in the form of a backscatter signal. To elaborate, if the tag device is a passive tag then the tag device may include circuitry to at least partially reflect non-absorbed portions of electromagnetic signals received from the ambient environment, such as transmitted by the reader device, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Semi-active tags usually include an on-board power source to provide energy for on-board electronic components. In general, semi-active tags often have more computational power than semi-passive tags and include one or more of active RF components (e.g., low noise amplifier (LNA), mixers, power amplifier (PA), etc.).

Active tags often include an on-board power source and more computational capacity than passive, semi-passive, or semi-active tags. Moreover, unlike passive, semi-passive, and semi-active tags that normally are unable to transmit unless a reader device is in proximity to them, active tags are able to transmit regardless of a proximity of a reader device. Active tags often include a power source and are able to actively transmit. In particular, unlike passive and semi-passive and semi-active tags that generate a backscatter signal by at least partially reflecting a transmission received from a reader or an RF source/activating device, active tags are capable of transmitting independently of a signal received from another device, such as the reader device.

In some implementations, UE 115 may include one or more components as described herein with reference to UE 115 of FIG. 2. In some implementations, UE 115 is a 5G-capable UE, a 6G-capable UE, or a combination thereof.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), one or more receivers 358 (hereinafter referred to collectively as "receiver 358"), and a clock 359. In some implementations, base station 105 may include an interface (e.g., a communication interface) that includes transmitter 356, receiver 358, or a combination thereof. Processor 352 may be configured to execute instructions 360 stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store instructions 360, and transmission configuration information 364 (e.g., scheduling request configuration information), and a traffic type 368. Transmission configuration information 364 may include or correspond to transmission configuration information 307. Transmission configuration information 364 may include or indicate a transmission configuration for one or more UEs, such as UE 115. For example, the transmission configuration may be associated with a communication session of UE 115. Transmission configuration information 364 may include or indicate an interval 366, a periodicity 367, or a combination thereof. Interval 366 may include or correspond to interval 308. Periodicity 367 may include or correspond to periodicity 309.

In some implementations, base station 105 is configured to select or determine a transmission configuration based on an indicator or a request received from UE 115. For example, the indicator (or the request) may include or indicate traffic information 310, capability 311 (e.g., device type, energy harvesting information, etc.), or a combination thereof. Additionally, or alternatively, the indicator (or the request) may include or indicate a transmission configuration selected or preferred by UE 115. In some implementations, bases station 105 may select the transmission configuration from multiple available transmission configurations. The selection or determination of the transmission configuration by base station 105 (based on the indicator or the request received from UE 115) may be defined by a standard. For example, base station 105 may select the transmission configuration from multiple transmission configurations based on one or more aspects of traffic information 310, capability 311 (e.g., device type, energy harvesting information, etc.), a transmission configuration selected or preferred by UE 115, a transmission configuration based on base station 105 power saving mode or operation, or a combination thereof. Additionally, or alternatively, base station 105 may determine or select energy harvesting information (e.g., one or more energy harvesting parameters) for UE 115. The one or more energy harvesting parameters may be the same as or different from energy harvesting information provided to base station 105 from UE 115. In some implementations, base station 105 may need to know whether or not UE 115 is configured to perform energy harvesting for UE 115 using the particular radio (e.g., a low power or zero power radio), such as the second radio, of UE 115.

In some implementations, base station 105 may determine whether or not to support energy harvesting for UE 115 using the particular radio (e.g., a low power or zero power radio) of UE 115. For example, base station 105 may need to know whether UE 115 uses the particular radio because the signals used for communications (e.g., waveforms, modulations, and signals configurations (transmissions from UE 115 to base station 105 (e.g., UL) and reception from UE 115 from base station 105 (e.g., DL))) might be different from the signals that need to be transmitted to the particular radio to support energy harvesting at UE 115. In some implementations, UE 115 provides base station 105 with an indication that UE 115 has activated (or deactivated) the second radio, such as a ZP-IoT or passive device, for energy harvesting, communication of data signals, or a combination thereof. Accordingly, base station 105 may know when the second radio is activated. In some aspects, the UE 115 may receive an L1/L2/L3 indication through second radio from base station 105 to wake up the first radio or to operate the first radio.

In some implementations, transmission configuration information 364 includes scheduling request configuration information. Transmission configuration information 364 may include or indicate a scheduling request configuration for one or more UEs, such as UE 115. For example, the scheduling request configuration may be associated with a communication session of UE 115. Transmission configuration information 364 may include or indicate an interval 366, a periodicity 367, or a combination thereof. Interval 366 may include or correspond to interval 308. Periodicity 367 may include or correspond to periodicity 309.

Traffic type 368 may include or indicate a type of traffic associated with a communication session of UE 115. Traffic type 386 may include or correspond to traffic information 310. For example, the communication session may be between UE 115 and network node 170. The communication session may include an XR communication session, such as a VR communication session, an MR communication session, or an AR communication session, as illustrate, non-limiting examples. Accordingly, traffic type 368 may include or indicate an XR type, a VR type, an MR type, an AR type, a non-XR type, a voice type, a video type, or a combination thereof. In some implementations, base station 105 may be configured to select a transmission configuration, such as an interval (e.g., 366) or a periodicity (e.g., 367), based on traffic type 368.

In some implementations, memory 354 may also be configured to store capability information of UE 115, such as capability 311. For example, base station 105 may receive an indication of one or more capabilities of UE. In some implementations, base station 105 may be configured to select a transmission configuration based on the one or capabilities of UE 115, traffic type 368, a requested transmission configuration received from UE 115, or a combination thereof.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, base station 105 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Clock 359 may include or correspond to clock 319. Clock 359 may be configured to track or determine one or more time periods or one or more durations. For example, base station 105 may use clock 359 to track, determine, or identify expiration of one or more intervals (e.g., 366). Additionally, or alternatively, base station 105 may use clock 359 in association with a periodicity (e.g., 367) of one or more transmissions (e.g., a scheduling request), DRX operations, or a combination thereof.

Network node 170 may include application 306. Application 306 may include an XR application. In some implementations, network node 170 may be configured to perform at least a portion of XR functionality associated with execution of application 306 at UE 115. For example, the XR functionality may include or be associated with simultaneous localization, mapping, and map optimization (SLAM) with point cloud datasets, hand gesture and pose estimation, object detection and tracking, multimedia processing and transport, or a combination thereof, as illustrative, non-limiting example. Examples of multimedia processing and transport may include rendering, audio and sensor encoding, or a combination thereof, as illustrative, non-limiting examples. Network node 170 may be configured to communicate with UE 115 via base stations 105.

In some implementations, wireless communications network 300 implements a 5G NR network. For example, wireless communications network 300 may include multiple 5G-capable UEs 115 and multiple 5G-capable base stations 105, such as UEs and base stations configured to operate in accordance with a 5G NR network protocol such as that defined by the 3GPP. In some other implementations, wireless communications network 300 implements a 6G network.

Traffic, such as XR traffic, of a communication may include communication between UE 115 and base station 105 or communication between UE 115 and network node 170 via base station 105. XR traffic may be occur in bursts that are transmitted periodically. There are bursts of XR traffic that can vary in packet size, number of packets per burst, or a combination thereof. For example, a first traffic burst may include one packet and a second traffic burst may include three packets. To illustrate, the XR traffic may include a burst of multiple messages or packages followed by a period of reduced (or no) traffic/messages. During the traffic bursts, UE 115 may need to have dense periodic messages, such as physical downlink control channels (PDCCHs), physical uplink control channels (PUCCHs), SPS/CG, tracking reference signal (TRS), channel state information-reference signal (CSI-RS) for beam management, sounding reference signal (SRS), scheduling requests (SRs), etc. Outside these bursts, such operations/messages may not be needed to be very dense and can be sparse, e.g., a UE may not need to track TRS or monitor PDCCH as frequent to save power.

Additionally, the bursts of XR traffic occur at non-integer periods (e.g., non-integer cycles), such as 1/60 frames per second (fps) which is equal to a 16.67 millisecond (ms) period or 1/120 fps which is equal to an 8.33 ms period. Arrival times of XR traffic may also vary and may have a jitter within approximately +/−4 ms. One possible cause of the jitter may be a delay between an XR application to send data to a physical layer.

The XR traffic may also include one or more flows (e.g., multiple flows) that are configured with different configurations. For example, in UL communication, a flow can be associated with a pose (the orientation of the glasses), and a second flow can carry the data. In some implementations, the first flow, the second flow, or a different flow may include communication of one or more transmissions (e.g., one or more scheduling requests). Additionally, or alternatively there may also be multiple flows in DL communication. Multiple flows may have different cycle lengths, different jitter, different bursts, or a combination thereof. The flows can be on different channels, different bands, or multiplexed on the same channel or the same band. To illustrate, in the UL, they can be multiplexed time multiplexed, frequency multiplexed, or space division multiplexed (SDM), as illustrative, non-limiting examples.

During operation of wireless communications network 300, UE 115 may establish a communication session with network node 170 via base station 105. Base station 105 may generate a transmission configuration for the communication session of UE 115. For example, base station 105 may determine a traffic type (e.g., 368) of data transmitted as part of the communication session. For example, base station 105 may determine that the traffic type include or is associated with bursts of data, such as bursts of data included in an XR communication session. In some implementations, base station 105 may generate the transmission configuration based on the traffic type.

The transmission configuration (e.g., a first transmission configuration) may include or indicate an interval 366, a periodicity 367, or a combination thereof. In some implementations, the transmission configuration may be associated with a set of transmissions, such a first transmission and a second transmission. The first transmission may be associated with a first scheduling resource, have a first periodicity, or a combination thereof. The second transmission may be associated with a second scheduling resource, have a second periodicity, or a combination thereof. The first scheduling resource may be the same as or different from the second scheduling resource. The first periodicity may be the same as or different from the second periodicity. Based on the transmission configuration, base station 105 may generate and transmit a first transmission configuration indicator 370 that includes or indicates the transmission configuration.

In some implementations, the transmission configuration may include or indicate a transmission period (e.g., a time period) for transmission of the set of transmissions (e.g., a burst of transmissions). For example, the transmission configuration may include or indicate a duration of the transmission period (e.g., the time period) during which the set of transmissions (e.g., the burst of transmissions) can be transmitted.

In some implementations, base station 105 may determine the transmission configuration or first transmission configuration indicator 370 based on DRX, such that UE 115 is configured to transmit one or more transmissions of a set of transmissions during a DRX on duration. Base station 105 may generate a radio resource control (RRC) configuration that includes an information element that includes the first transmission configuration indicator and a DRX cycle configuration indicator. In some implementations, first transmission configuration indicator 370 includes or is included in an RRC configuration, an information element, or a combination thereof.

UE 115 may receive first transmission configuration indicator 370 and determine the transmission configuration based on first transmission configuration indicator 370. For example, UE 115 determine interval 366, a periodicity 367, or a combination thereof based on first transmission configuration indicator 370. UE 115 may store interval 366 as interval 308, store periodicity 367 as periodicity 309, or a combination thereof.

UE 115 may transmit transmission 372 based on the transmission configuration. For example, UE 115 may transmit a set of transmissions (e.g., 372) that includes the first transmission, the second transmission, or a combination thereof. After sending transmission 372, UE 115 may transmit data packet 374. For example, data packet 374 may be associated with transmission 372 and may include a burst of XR data of the communication session. In some implementations, transmitting transmission 372 may include transmitting multiple transmissions (e.g., 372) based on periodicity 309. Additionally, or alternatively, after transmitting transmission 372, UE 115 may transmit another transmission based on interval 308. For example, UE 115 may transmit another set of transmissions (e.g., 372) that includes the first transmission, the second transmission, or a combination there of. Base station 105 may receive transmission 372, data packet 374, or a combination thereof.

In some implementations, after transmission of first transmission configuration indicator 370, base station 105 may generate another transmission configuration (e.g., a second transmission configuration) to change or update the first transmission configuration. For example, the second transmission configuration may change the set of transmissions (e.g., a number of transmissions included in the set of transmissions), a transmission resource, a periodicity, an interval, or a combination thereof. Based on the second transmission configuration, base station 105 may generate and transmit a second transmission configuration indicator 376 that includes or indicates the second transmission configuration. In some implementations, second transmission configuration indicator 376 may include or be included in downlink control information (DCI) or a medium access control-control element (MAC-CE).

UE 115 may receive second transmission configuration indicator 376 and determine the second transmission configuration based on second transmission configuration indicator 376. UE 115 may change or update transmission configuration information 307 based on the second transmission configuration. Additionally, or alternatively, UE 115 may transmit one or more transmissions (e.g., 372) based on the second transmission configuration.

As described with reference to FIG. 3, the present disclosure provides techniques for supporting a transmission configuration. The techniques described reduce control overhead and improve performance by configuring or matching the transmission configuration to traffic (e.g., bursts of XR traffic) of the communication session. The techniques described herein may also enable and provide improved communications, including efficient resource utilization, improved network access, higher data rates, increased traffic capacity, increased spectral efficiency, or a combination thereof.

Referring to FIGS. 4-9, FIGS. 4-9 include diagrams of examples of a communication flow of a communication session according to one or more aspects. The communication session may be establish between UE 115 and base station 105 or with network node 170. As shown in FIGS. 4-9, the communication flow of the communication session corresponds to one or more transmissions by UE 115. The one or more transmissions may include or correspond to transmission 372. For example, UE 115 may transmit one or more groups of transmissions based on a transmission configuration (e.g., 307). As described with reference to FIGS. 4-9, the transmission configuration is a scheduling request configuration. However, the description of the scheduling request configuration with respect FIGS. 4-9 is not intended to be limited and the term "scheduling request" may be substituted with "transmission" for a more general description of FIGS. 4-9.

Each of FIGS. 4-9 illustrates transmission of one or more sets of scheduling requests over time. Transmission of the one or more sets of scheduling requests is based on a scheduling request configuration that may include or correspond to transmission configuration information 307 or 364. A transmission of a group of scheduling requests may include one or more scheduling requests associated with a periodicity (e.g., 309 or 367). Additionally, or alternatively, transmission of consecutive groups of scheduling requests may be based on an interval (e.g., 308 or 366).

In some implementations, one or more scheduling request configurations may be defined by base station 105. Additionally, or alternatively, base station 105 may define one or more intervals (e.g., 308 or 366) for the scheduling request configurations. A set of scheduling request defined by a scheduling request configuration may include multiple scheduling requests with different periodicities (e.g. 309 or 367). Accordingly, in some implementations, the scheduling request configuration of a set of scheduling requests includes or indicates a periodicity of a scheduling request (of a set of scheduling requests) and an interval associated with consecutive transmissions of the set of scheduling requests, such as a first transmitted group of the set of scheduling requests and a second transmitted group of the set of scheduling requests. Accordingly, it is to be understood that the set of scheduling requests may repeat over time (e.g., may be cyclic). To illustrate, the set of scheduling requests may repeat every X msec, where X is a positive number, and at least one scheduling request of the set of scheduling requests includes a cyclic periodicity (denoted "P"). Additionally, the sequence of repeating groups of the set of scheduling request may be semi-static.

In some implementations, an interval (e.g., 308 or 366), a periodicity (e.g., 309 or 367), or a combination thereof may change or be updated. For example, base station 105 may change or update the interval (e.g., 308 or 366), the periodicity (e.g., 309 or 367), or a combination thereof. Accordingly, the interval (e.g., 308 or 366), the periodicity (e.g., 309 or 367), or a combination thereof may be semi-static. To change or update the interval (e.g., 308 or 366), the periodicity (e.g., 309 or 367), or a combination thereof, base station 105 may generate and transmit a DCI indication, including non-scheduling DCI and scheduling DCI, or MAC-CE.

In some implementations, the interval (e.g., 308 or 366) may be associated with or correspond to DRX on and off (e.g., there is UL and DL alignment and scheduling requests are expected to overlap with DRX on) or with a burst periodicity (e.g., of communication session traffic or with a burst of scheduling requests). For example, base station 105 may configure or select the interval (e.g., 308 or 366) based on long cycles or short cycles. In some implementations, an RRC configuration or an information included in the RRC configuration may be used by base station 105 to configure both the DRX cycles and the interval (e.g., 308 or 366).

Figure 4:
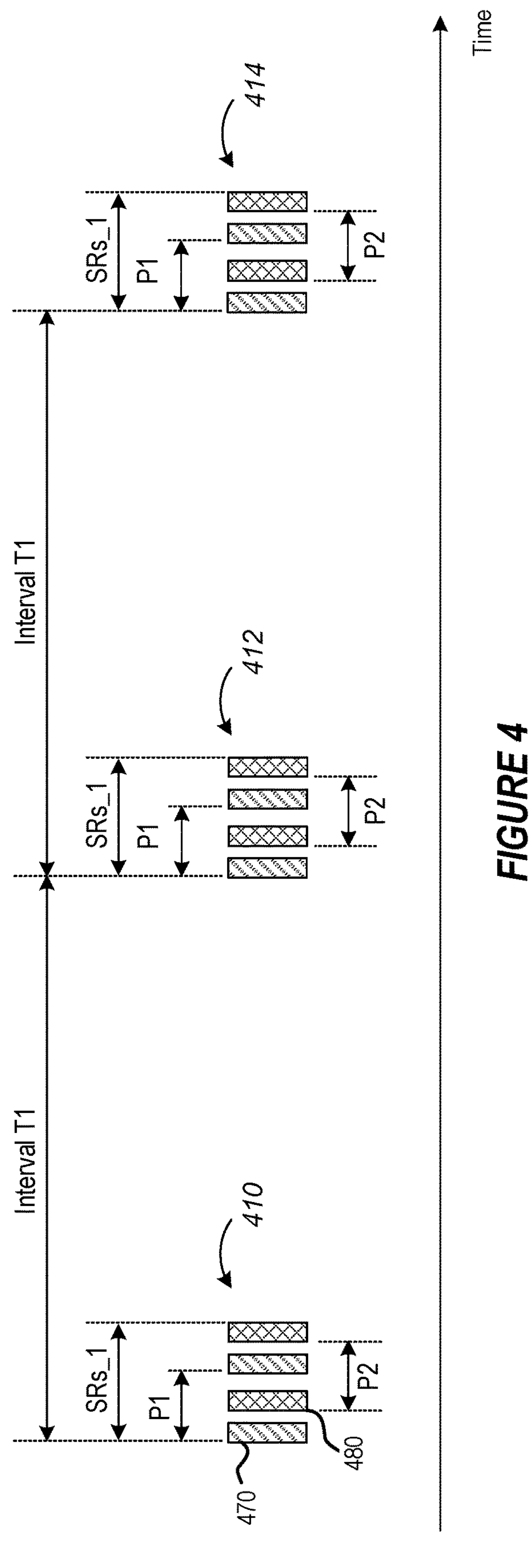
FIGS. 4-9 include diagrams of examples of a communication flow of a communication session according to one or more aspects.

Referring to FIG. 4, FIG. 4 is a diagram of an example of a communication flow 400 of a communication session according to one or more aspects. A scheduling request configuration may include or indicate a configuration of a set of scheduling requests and a repetition interval (Interval T1) for the set of scheduling requests. The scheduling request configuration may include or correspond to transmission configuration information 307 or 364, first transmission configuration indicator 370, or second transmission configuration indicator 376. The repetition interval (Interval T1) may include or correspond to interval 308 or 366. The set of scheduling request may include a first scheduling request 470 and a second scheduling request 480. First scheduling request 470 may be associated with or correspond to a first scheduling resource, may have a first periodicity (P1), or a combination thereof. Second scheduling request 480 may be associated with or correspond to a second scheduling resource, may have a second periodicity (P2), or a combination thereof. First periodicity (P1), second periodicity (P2), or both, may include or correspond to periodicity 309 or 367.

As shown in FIG. 4, a group of the set of scheduling requests are transmitted during a transmission time period (SRs_1). For example, UE 115 may transmit a first group 410, a second group 412, and a third group 414. The group of the set of scheduling requests may be a burst of scheduling requests. In some implementations, the scheduling request configuration may include or indicate a transmission time period (SRs_1). As shown in FIG. 4, the repetition interval (Interval T1) indicates a time period from a start of a first transmission time period (SRs_1) and a start of a next transmission time period (SRs_1) (e.g., a second transmission time period (SRs_1)).

Figure 5:
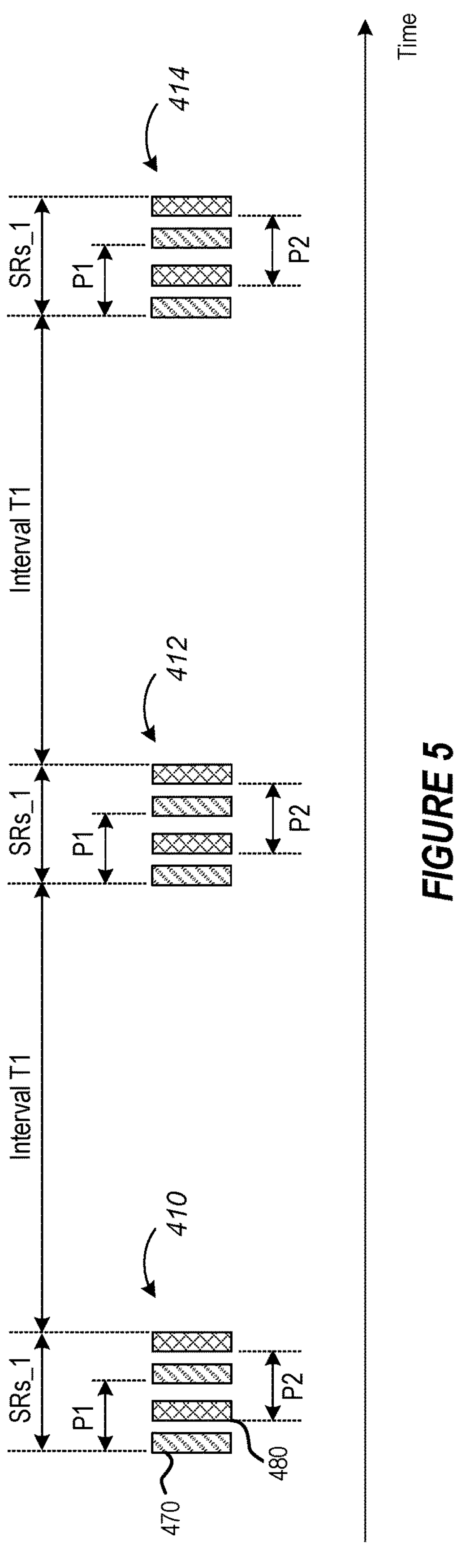

Referring to FIG. 5, FIG. 5 is a diagram of an example of a communication flow 500 of a communication session according to one or more aspects. As compared to communication flow 400, the repetition intervals (e.g., Interval T1) of communication flow 500 indicates a time period between an end of a first transmission of a group of scheduling requests (e.g., 410) and start of second transmission of a group scheduling request (e.g., 412), such as a next group of scheduling request after the first group of scheduling requests.

Figure 6:
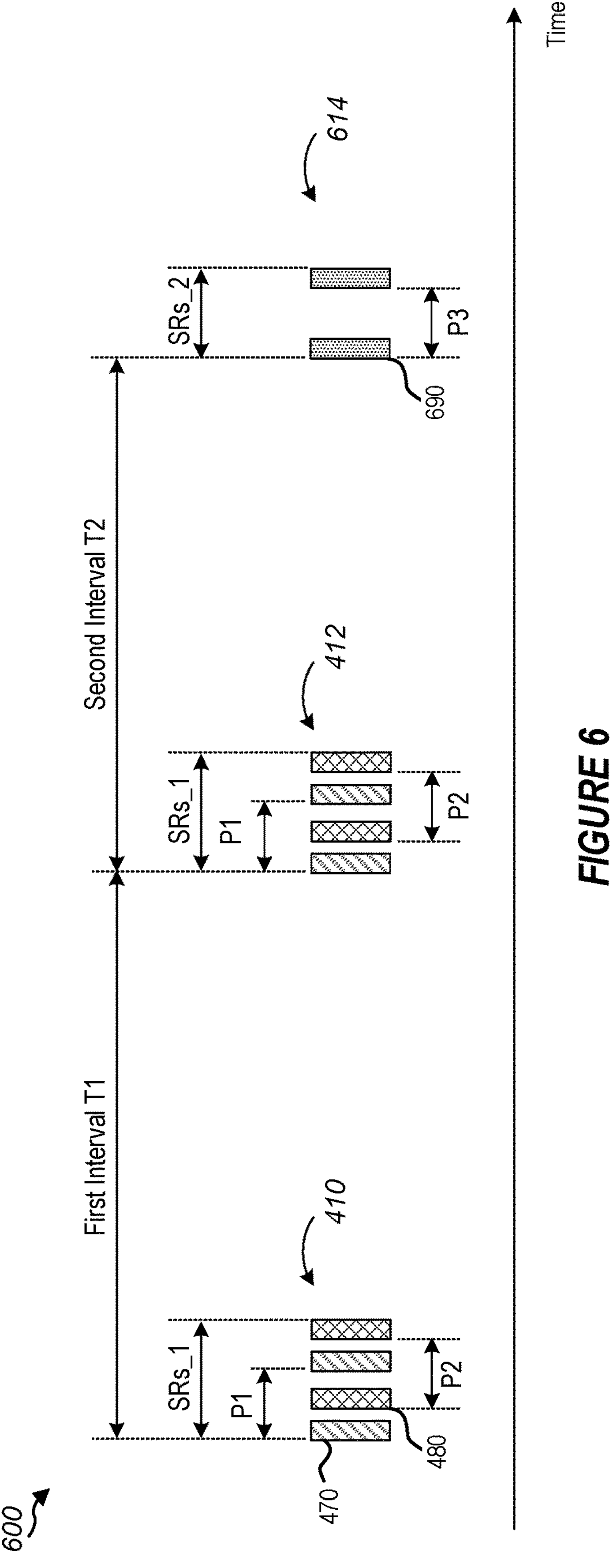

Referring to FIG. 6, FIG. 6 is a diagram of an example of a communication flow 600 of a communication session according to one or more aspects. Communication flow 600 is based on a first scheduling request configuration and a second scheduling request configuration. The first scheduling request configuration may include or correspond to first transmission configuration indicator 370 and the second scheduling request configuration may include or correspond to second transmission configuration indicator 376.

The first scheduling request configuration may include or indicate a configuration of a first set of scheduling requests and a first repetition interval (Interval T1) for the first set of scheduling requests. The first scheduling request configuration may include or correspond to transmission configuration information 307 or 364 or first transmission configuration indicator 370. The first repetition interval (Interval T1) may include or correspond to interval 308 or 366. The first set of scheduling request may include a first scheduling request 470 and a second scheduling request 480. First scheduling request 470 may be associated with or correspond to a first scheduling resource, may have a first periodicity (P1), or a combination thereof. Second scheduling request 480 may be associated with or correspond to a second scheduling resource, may have a second periodicity (P2), or a combination thereof. First periodicity (P1), second periodicity (P2), or both, may include or correspond to periodicity 309 or 367.

As shown in FIG. 6, a group of the first set of scheduling requests are transmitted during transmission time period (SRs_1). For example, UE 115 may transmit a first group 410 and a second group 412. The group of the first set of scheduling requests may be a burst of scheduling requests. In some implementations, the first scheduling request configuration may include or indicate a first transmission time period (SRs_1). As shown in FIG. 6, the first repetition interval (Interval T1) indicates a time period from a start of a first transmission time period (SRs_1) and a start of a next transmission time period (SRs_1) (e.g., a second transmission time period (SRs_1)).

The second scheduling request configuration may include or indicate a configuration of a second set of scheduling requests and a second repetition interval (Interval T2) for the second set of scheduling requests. The second scheduling request configuration may include or correspond to transmission configuration information 307 or 364 or transmission request configuration indicator 376. The second repetition interval (Interval T2) may include or correspond to interval 308 or 366. The second set of scheduling request may include a third scheduling request 690. Third scheduling request 690 may be associated with or correspond to a third scheduling resource, may have a third periodicity (P3), or a combination thereof. Third periodicity (P3) may include or correspond to periodicity 309 or 367.

As shown in FIG. 6, a group of the second set of scheduling requests are transmitted during transmission time period (SRs_2). For example, UE 115 may transmit a third group 614. The group of the second set of scheduling requests may be a burst of scheduling requests. In some implementations, the second scheduling request configuration may include or indicate a second transmission time period (SRs_2). As shown in FIG. 6, the second repetition interval (Interval T1) indicates a time period from a start of a transmission time period, such as a first transmission time period (SRs_1) and a start of a next transmission time period (SRs_2).

It is noted that UE 115 may receive an indication of the first scheduling request configuration prior to transmission of the first group 410. Additionally, or alternatively, UE 115 may receive an indication of the second scheduling request configuration prior to transmission of third group 614. To further illustrate, UE 115 may receive the indication of the second scheduling request configuration after transmission of the first group 410, during transmission of the second group 412, or after transmission of the second group 412. In some implementations, if UE 115 receives indication of the second scheduling request configuration after transmission of the second group 412, UE 115 may alternatively transmit the third group 614 based on the first repetition interval (Interval T1) rather than based on second repetition interval (Interval T2).

Figure 7:
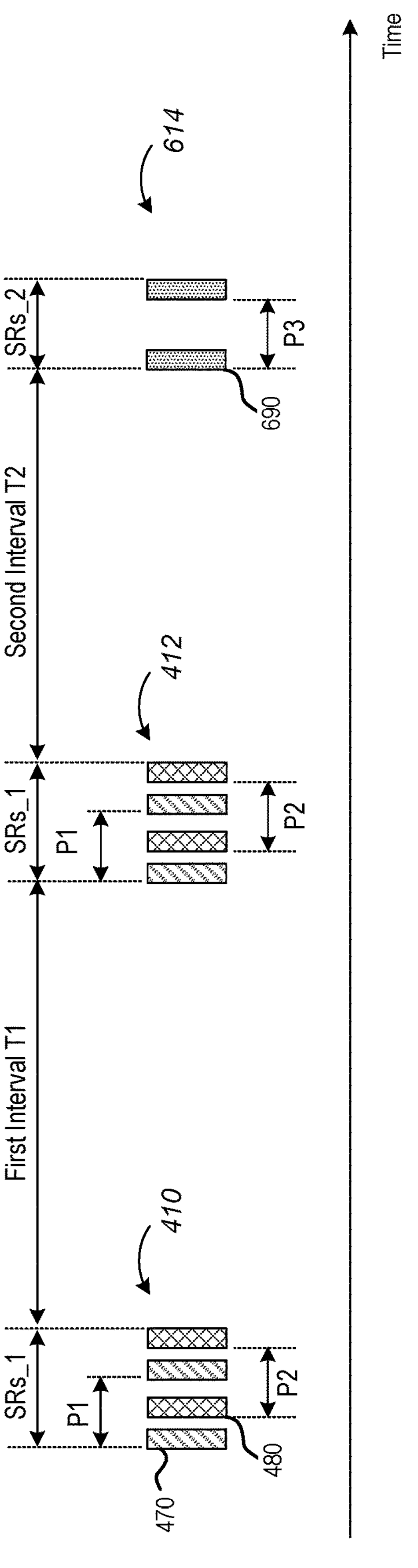

Referring to FIG. 7, FIG. 7 is a diagram of an example of a communication flow 700 of a communication session according to one or more aspects. As compared to communication flow 600, intervals (e.g., first interval T1 and second interval T2) of communication flow 700 indicates a time between an end of a first transmission of a group of scheduling requests and start of second transmission of a group scheduling request, such as a next group of scheduling request after the first group of scheduling requests.

Figure 8:
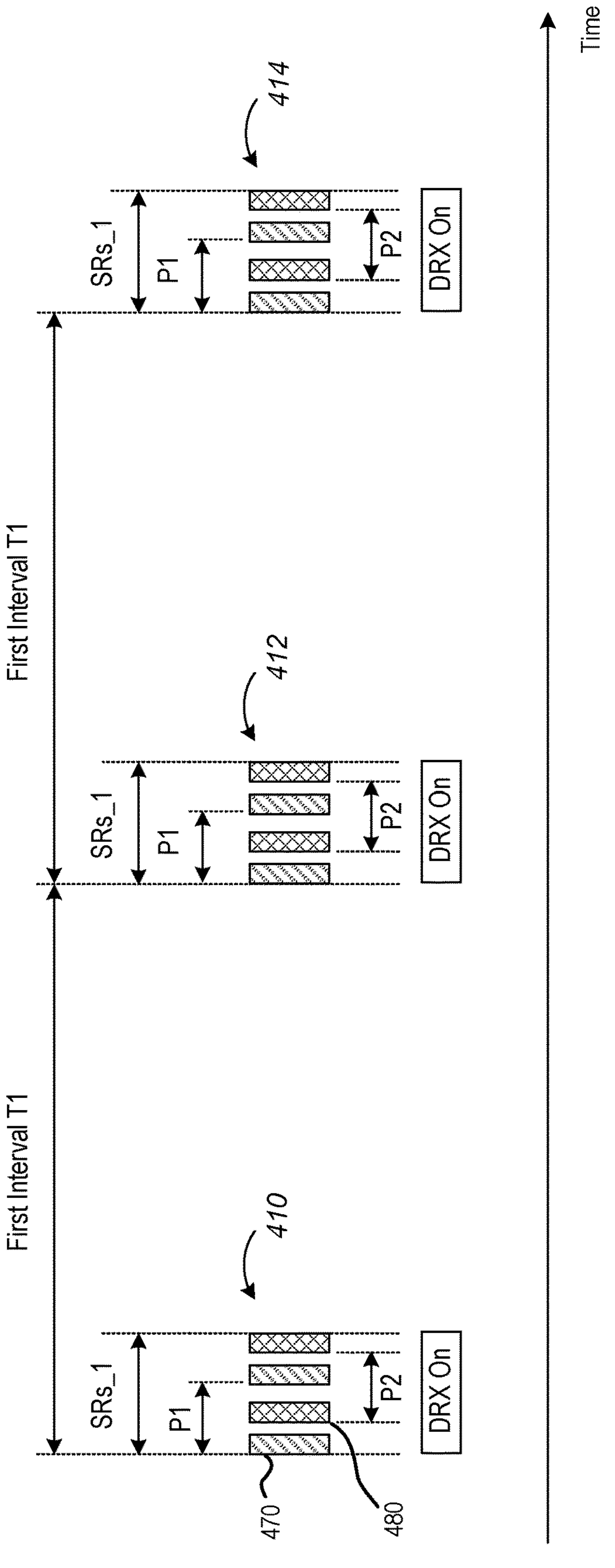

Referring to FIG. 8, is a diagram of an example of a communication flow 800 of a communication session according to one or more aspects. Communication flow 800 may include or correspond to communication flow 400. As compared to communication flow 400, communication flow 800 shows that the transmission time periods (SRs_1) at least partially overlap or completely overlap in time with a DRX on duration.

Figure 9:
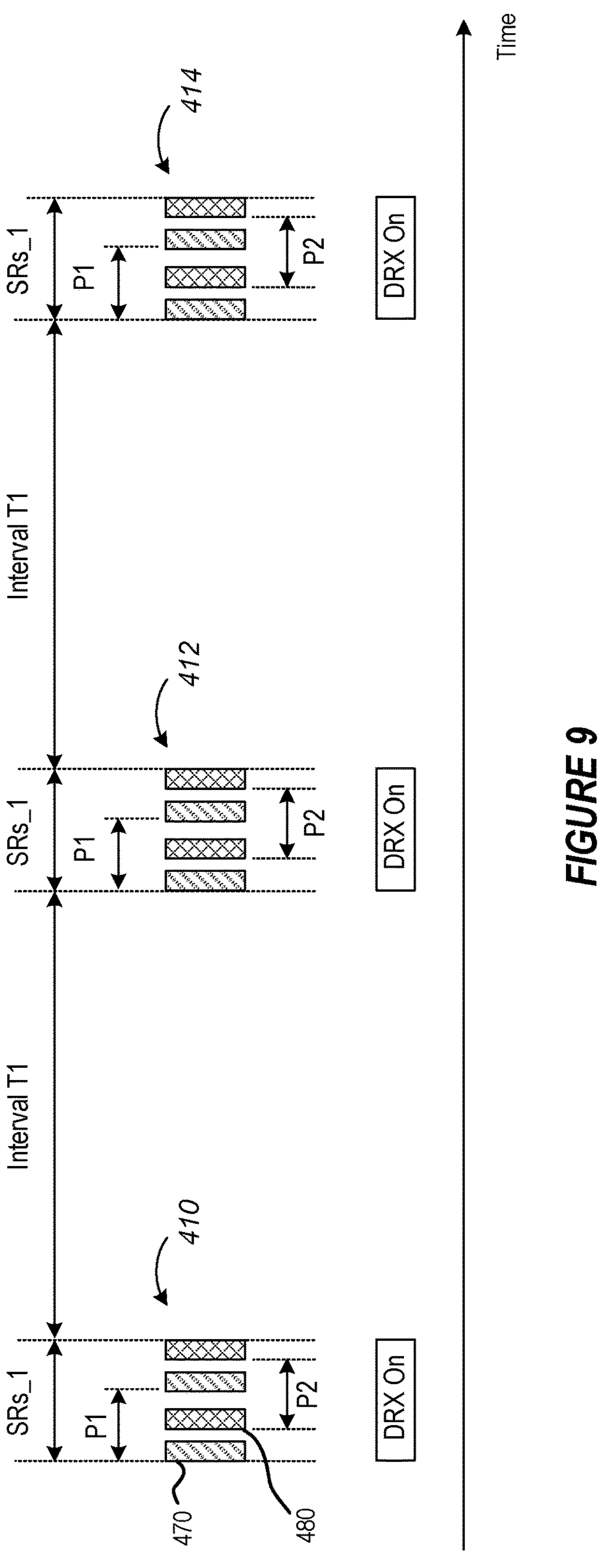

Referring to FIG. 9, is a diagram of an example of a communication flow 900 of a communication session according to one or more aspects. As compared to communication flow 800, intervals (e.g., interval T1) of communication flow 900 indicates a time between an end of a first transmission of a group of scheduling requests and start of second transmission of a group scheduling request, such as a next group of scheduling request after the first group of scheduling requests.

FIG. 10 is a flow diagram illustrating an example process 1000 that supports a transmission configuration according to one or more aspects. Operations of process 1000 may be performed by a UE, such as UE 115 described above with reference to FIGS. 1-3 or a UE described with reference to FIG. 11. For example, example operations (also referred to as "blocks") of process 1000 may enable UE 115 to support a transmission configuration.

In block 1002, the UE establishes a communication session with a network entity. For example, the network entity may include or correspond to network node 170. In some implementations, the UE establishes the communication with the network entity via a network, such as wireless communication network 100 or 300. To illustrate, the UE establishes the communication with the network entity via a base station, such as base station 105. The communication session may include an XR communication session. The XR communication session may include a VR communication session, an MR communication session, or an AR communication session. In some implementations, a type of the communication session may include or correspond to traffic type 368.

In block 1004, the UE receives a first scheduling request configuration indicator for the communication session. For example, the first scheduling request configuration indicator may include or correspond to first transmission configuration indicator 370. The first scheduling request configuration indicator may indicate a first configuration of a first set of scheduling requests, and a first repetition interval for the first set of scheduling requests. In some implementations, the first repetition interval indicates a time period between consecutive transmissions of the first set of scheduling requests or a cyclic repetition of a start of the first set of scheduling request. The first configuration may include a first periodicity of first scheduling requests of the first set of scheduling requests. The first scheduling requests may be associated with a first scheduling request resource. The first configuration may include or correspond to transmission configuration information 307 or 364. The first repetition interval may include or correspond to interval 308 or 366. The first periodicity may include or correspond to periodicity 309 or 367.

In some implementations, the UE may, during the communication session and based on the first configuration and the first repetition interval, transmit a first burst of scheduling requests associated with the first set of scheduling requests. The first set of scheduling request may include or correspond to transmission 372. After transmitting the first burst of scheduling requests, the UE may transmit a second burst of scheduling requests associated with the first set of scheduling requests.

In some implementations, the first scheduling request configuration indicator further indicates a second configuration of the first set of scheduling requests. The second configuration may include second periodicity of second scheduling requests of the first set of scheduling requests. The second configuration may include or correspond to transmission configuration information 307 or 364. The second periodicity may include or correspond to periodicity 309 or 367. The second scheduling requests may be associated with a second scheduling resource. In some implementations, the first periodicity is different from the second periodicity. In other implementations, the first periodicity is the same as the second periodicity.

In some implementations, the UE receives a second scheduling request configuration indicator for the communication session. The second scheduling request configuration indicator may include or correspond to second transmission configuration indicator 376. In some implementations, the second scheduling request configuration indicator received by the UE is includes in DCI or an MAC-CE that includes the second scheduling request configuration indicator. The second scheduling request configuration indicator may indicating a third configuration of a second set of scheduling requests, and a second repetition interval for the second set of scheduling requests. The third configuration may include a third periodicity of third scheduling requests of the second set of scheduling requests. The third configuration may include or correspond to transmission configuration information 307 or 364. The second repetition interval may include or correspond to interval 308 or 366. The third periodicity may include or correspond to periodicity 309 or 367.

In some implementations, during the communication session and after receiving the first scheduling request configuration indicator, the UE transmits, based on the first configuration and the first repetition interval, a first burst of scheduling requests associated with the first set of scheduling requests. The first burst of scheduling requests may include or correspond to transmission 372. After transmitting the first burst of scheduling requests, the UE may transmit, based on the third configuration and the second repetition interval, a second burst of scheduling requests associated with the second set of scheduling requests. In some implementations, the second burst of scheduling request is a next scheduling request burst transmitted from the UE after the first burst of scheduling request.

In some implementations, the first repetition interval is associated with a timer. The timer may include or correspond to clock 319 or 359. Additionally, or alternatively, the first scheduling request configuration indicator may include an information element that indicates the first repetition interval.

In some implementations, the first repetition interval is based on a DRX such that transmission of the first set of scheduling requests occurs during a DRX on duration. Additionally, or alternatively, the first scheduling request configuration indicator may be received by the UE based on a short DRX cycle or a long DRX cycle. In some implementations, the UE may receive an RRC configuration that includes an information element that includes the first scheduling request configuration indicator and a DRX cycle configuration indicator.

FIG. 11 is a flow diagram illustrating an example process 1000 that supports a transmission configuration according to one or more aspects. Operations of process 1000 may be performed by a UE, such as UE 115 described above with reference to FIGS. 1-3 or a UE described with reference to FIG. 11. For example, example operations (also referred to as "blocks") of process 1000 may enable UE 115 to support a transmission configuration.

In block 1102, the UE receives a first transmission configuration indicator for one or more transmissions associated with a communication session. For example, the first transmission configuration may include or correspond to transmission configuration information 307, 364 or first transmission configuration indicator 370. The first transmission configuration indicator may indicate a first configuration for a first set of transmissions. The first configuration may include a first periodicity of a first available transmission time for the first set of transmissions. Additionally, or alternatively, the first transmission configuration may indicate a first repetition interval for the first available transmission time. The first repetition interval may include or correspond to interval 308 or 366. The first periodicity may include or correspond to periodicity 309 or 367. In some implementations, the first transmission configuration indicator is a first scheduling request configuration indicator. Additionally, or alternatively, the first set of transmission may include a first set of scheduling requests. In some implementations, the communication session includes an extended reality (XR) communication session.

In block 1104, the UE transmits at least one transmission of the first set of transmissions based on the first transmission configuration indicator. The at least one transmission may include or correspond to transmission 372.

In some implementations, during the communication session and based on the first configuration and the first repetition interval, the UE transmits a first burst of transmission associated with the first set of transmission. After transmitting the first burst of transmission, the UE may transmit a second burst of transmission associated with the first set of transmission.

In some implementations, the first transmission configuration indicator further indicates a second configuration of the first set of transmission or a second set of transmissions. The second configuration may include or indicate a second periodicity of second transmission of the first set of transmission or the second set of transmissions.

In some implementations, the UE receives a second transmission configuration indicator for the communication session. The second transmission configuration indicator may include or correspond to second transmission configuration indicatory 376. The second transmission configuration indicator may indicate a third configuration of a second set of transmissions. The third configuration may include or correspond to transmission configuration information 307, 364. The third configuration may include or indicate a third periodicity of a third set of transmissions of the second set of transmissions, a second repetition interval for the second set of transmissions, or a combination thereof. The third periodicity may include or correspond to periodicity 309 or 367. The second repetition interval may include or correspond to interval 308 or 366.

In some implementations, during the communication session, the UE may transmit a first burst of transmissions associated with the first set of transmissions. For example, the UE may transmit the first burst of transmission after receiving the first transmission configuration indicator. Additionally, or alternatively, the UE may transmit the first burst of transmission based on the first configuration and the first repetition interval. In some implementations, after transmitting the first burst of transmissions, the UE may transmit a second burst of transmissions associated with the second set of transmissions. For example, the UE may transmit the second burst of transmissions based on the third configuration and the second repetition interval.

In some implementations, the first repetition interval is based on a discontinuous reception (DRX) such that transmission of the first set of transmissions occurs during a DRX on duration. Additionally, or alternatively, the first transmission configuration indicator may be received based on a short DRX cycle or a long DRX cycle. In some implementations, the UE may receive the first transmission configuration indicator includes receiving an RRC configuration that includes an information element that includes the first transmission configuration indicator and a DRX cycle configuration indicator.

In some implementations, the first set of transmissions include a scheduling request or a sounding reference signal. Additionally, or alternatively, the first set of transmissions may include or correspond to one or more uplink transmissions or one or more sidelink transmissions. In some implementations, transmissions of the first set of transmissions are periodic or aperiodic.

In some implementations, the UE may transmit a traffic indicator from the UE. The traffic indicator may include or correspond to traffic information 310 or 368. The traffic indicator may include or indicate, for the first set of transmissions, a start time for the first set of transmissions, a transmission size associated with the first set of transmissions, an end time for the first set of transmissions, an extension from the end time for the first set of transmissions, a traffic type of the first set of transmissions, an indication of an end of information, or a combination thereof. Additionally, or alternatively, one or more transmissions of the first set of transmissions include a scheduling request (SR), a channel sounding response (CSR) report, a sounding reference signal (SRS), configured grant (CG), a cluster (set) of data transmissions (e.g., physical uplink shared channel (PUSCH) or physical sidelink shared channel (PSSCH) transmissions), or a hybrid automatic repeat request (HARQ) acknowledgement (ACK).

In some implementations, the UE may generate a capability indicator of a capability of the UE. The capability may include or correspond to capability 311. The capability may include or correspond to an energy harvesting capability. The energy harvesting capability may include or indicate a charging rate profile, an energy state profile, an energy discharging rate profile, or a combination thereof. Additionally, or alternatively, the capability indicator may include or indicate a start time for energy information reported/indicated, an expiry time of energy information, an end time of the energy information, an extension from the end time, an indication of an end of information, or a combination thereof. In some implementations, the UE may transmit the capability indicator.

In some implementations, the UE may select a transmission configuration of multiple transmission configurations. The multiple transmission configurations may include or correspond to transmission configuration information 307 or 364. The multiple transmission configuration may be indicated by base station 105 or defined or determined based on a standard. The UE may transmit a request for the selected transmission configuration. In some implementations, the UE may select a transmission configuration of multiple transmission configurations based on traffic information (e.g., 310) or a capability (e.g., 311) of the UE.

In some implementations, UE 115 may activate a resource for energy harvesting during and an idle state or a sleep mode. The resource may include or correspond to energy harvesting circuitry 320. Additionally, or alternatively, UE 115 may include or correspond to a passive device. In some implementations, UE 115 may include two communication radios (e.g., two chips or modems) wherein the two radios can share at least one or more of radio-frequency (RF) components, hardware (HW) components, software (SW) components, or firmware (FW) components, or storage unit/battery or can be completely separate. For example, a first radio or integrated circuit configured to wireless communication, such as an NR radio, and a second radio or integrated circuit configured to operate at one or more of RRC states, power saving states, or sleep modes. To illustrate, the second radio or integrated circuit may include a zero power (ZP)-IoT radio configured to communicate and be used during low power states or certain sleeping modes/states or certain RRC modes/states, or combination thereof. Additionally, or alternatively, the second radio may be included in the same integrated circuit as the first radio, but is configured with lower functionality as compared to the first radio, is configured for energy harvesting, or a combination thereof. As an illustrative example of operation of UE 115, during RRC idle/inactive, UE 115 can go to ultra-low power state and use or activate the second radio or integrated circuit (e.g., the ZP-IoT radio). In some examples, during connected modes, and using certain power saving modes/states (i.e., low power saving mode/state) or sleeping modes/states, the UE 115 may use ZP-IoT radio for communications with a network entity. In some implementations, UE 115 may transmit the indicator (or the request) to use the second radio on L1, L2, or L3—e.g., UCI, PUSCH/PSSCH, MAC CE, RRC, or user assistance information (UAI)—indication with configured or dynamic allocated resources. In some other implementations, UE 115 may transmit the indicator (or the request) multiplexed with an L1, L2, or L3 signal—e.g., SR, BSR, HARQ ACK, RACH Msg. PHR, CSI, or a combination thereof. In some implementations, based at least one of energy information reported by UE 115 or request to use second radio (or request to use a certain combination of RRC state, power saving mode, sleeping mode at the UE 115), the NW entity may transmit the indicator to UE to use the second radio using an L1, L2, or L3—e.g., DCI, PDSCH/PSSCH, MAC CE, RRC, wakeup signal (WUS) signal, or indication with configured or dynamic allocated resources.

In some implementation, the UE generates or transmits transmitting a traffic indicator. The traffic indicator may be included in at least one of an L1 indication, an L2 indication, or an L3 indication, or multiplexed or piggybacked with the L1 indication, the L2 indication, or the L3 indication. In some implementations, the traffic indicator indicates, for the first set of transmissions, a start time for the first set of transmissions, a transmission time period associated with the first set of transmissions, an end time for the first set of transmissions, an extension from the end time for the first set of transmissions, a traffic type of traffic of the communication session, a start time of the traffic, an expected time period of the traffic, an end time for the traffic, an extension from the end time for the traffic, or a combination thereof. Additionally, or alternatively, one or more transmissions of the first set of transmissions include an SR, a CSR/CSI report, an SRS, a CG, one or more of burst data transmissions, or an HARQ ACK.

In some implementations, the UE generates or transmits generating a capability indicator of a capability of the UE. The capability indicator may be included in at least one of an L1 indication, an L2 indication, or an L3 indication, or multiplexed or piggybacked with the L1 indication, the L2 indication, or the L3 indication. In some implementations, the capability indicator indicates energy information that indicates an energy harvesting capability of the UE, the energy harvesting capability includes a charging rate profile value, an energy state profile value, an energy discharging rate profile value, or a combination thereof. The capability indicator may indicate a start time for the energy information, an expiry/end time of the energy information, an extension from the end/expiry time for the energy information, an indication of an end of use of the energy information, or a combination thereof.

In some implementations, the UE activates a ZP-IoT device or a passive device of the UE for energy harvesting during at least one of an RRC idle state, RRC inactive, RRC connected mode, RRC sleep mode, a power saving mode, or a sleep mode. Additionally, or alternatively, the UE receives at least one of an energy signal or a data/control signal, from the network entity, via the ZP-IOT device or the passive device to harvest energy.

Figure 12:
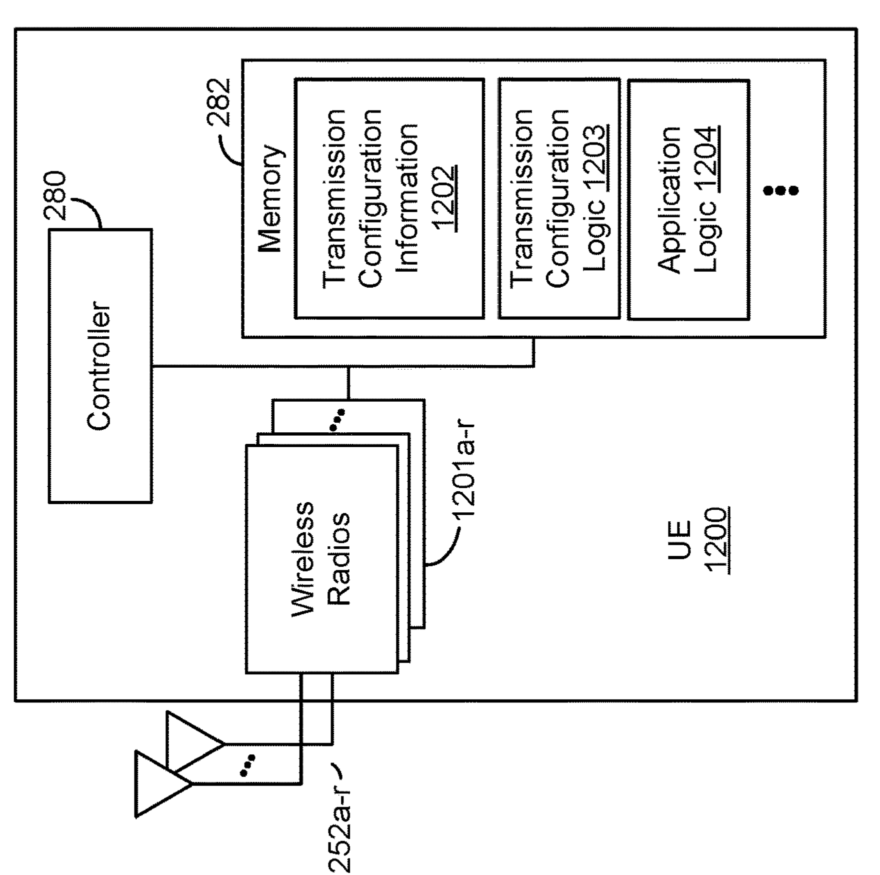
FIG. 12 is a block diagram of an example UE that supports a transmission according to one or more aspects.

FIG. 12 is a block diagram of an example UE 1200 that supports a transmission configuration according to one or more aspects. UE 1200 may be configured to perform operations, including the blocks of a process described with reference to FIG. 10. In some implementations, UE 1200 includes the structure, hardware, and components shown and described with reference to UE 115 of FIGS. 1-3. For example, UE 1200 includes controller 280, which operates to execute logic or computer instructions stored in memory 282, as well as controlling the components of UE 1200 that provide the features and functionality of UE 1200. UE 1200, under control of controller 280, transmits and receives signals via wireless radios 1201*a-r* and antennas 252*a-r*. Wireless radios 1201*a-r* include various components and hardware, as illustrated in FIG. 2 for UE 115, including modulator and demodulators 254*a-r*, MIMO detector 256, receive processor 258, transmit processor 264, and TX MIMO processor 266.

Figures 14, 15:
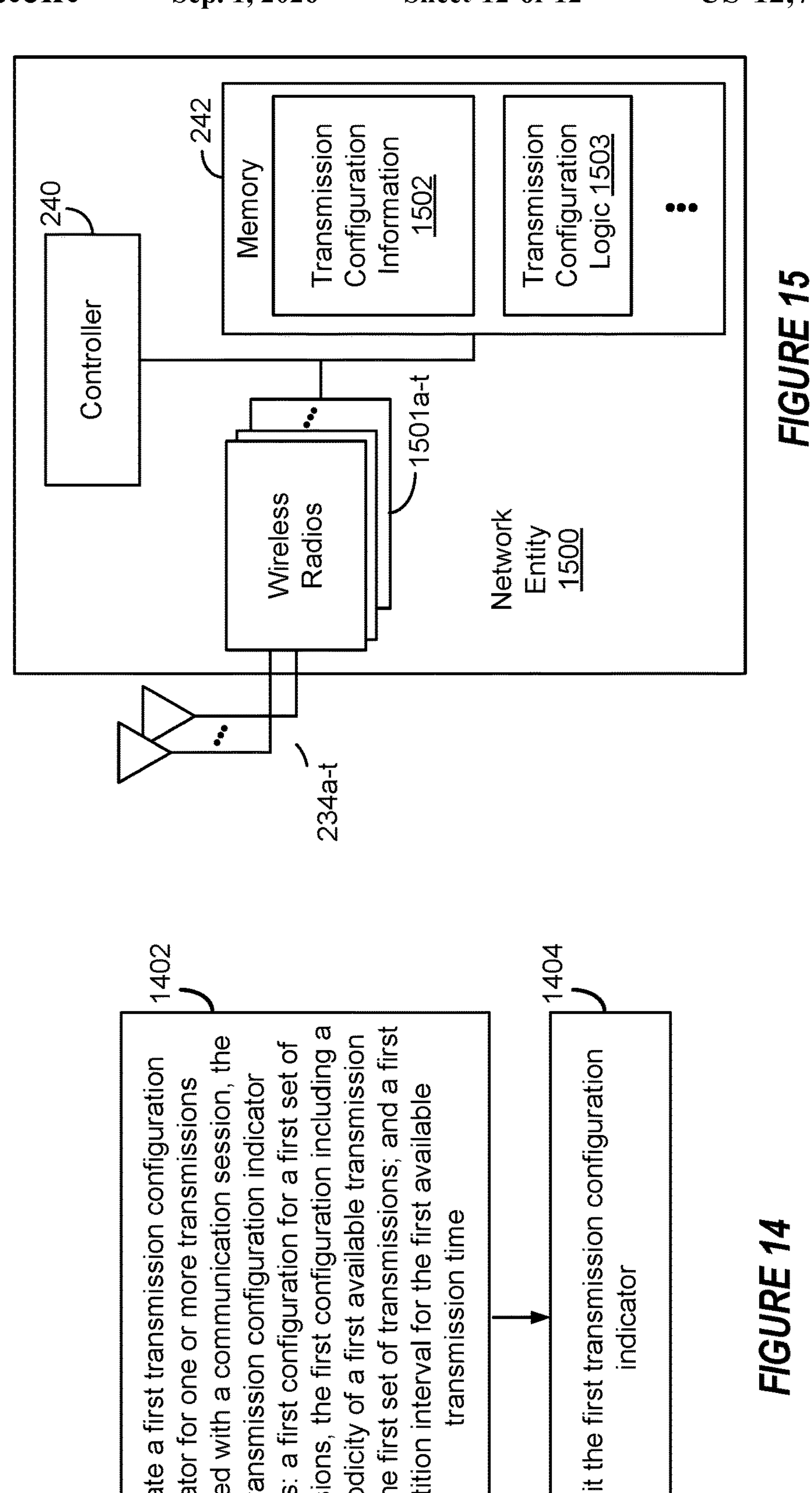
FIG. 14 is a flow diagram illustrating an example process that supports a transmission configuration according to one or more aspects.
FIG. 15 is a block diagram of an example network entity that supports a transmission configuration according to one or more aspects.

As shown, memory 282 may include transmission configuration information 1202, transmission configuration logic 1203, and application logic 1204. Transmission configuration information 1202 may include or correspond to transmission configuration information 307 or 364, interval 308 or 366, periodicity 309 or 367, or traffic type 368. Transmission configuration logic 1203 may be configured to enable UE 1200 to generate or transmit one or more transmissions, such as transmission 372, based on or in accordance with transmission configuration information 1202. Application logic 1204 may be configured to enable communication, such as XR communication, between UE 1200 and one or more other devices. Application logic 1204 may include or correspond to application 306. UE 1200 may receive signals from or transmit signals to one or more network entities, such as base station 105 of FIGS. 1-3 or a network entity 1500 as illustrated in FIG. 15.

Figure 13:
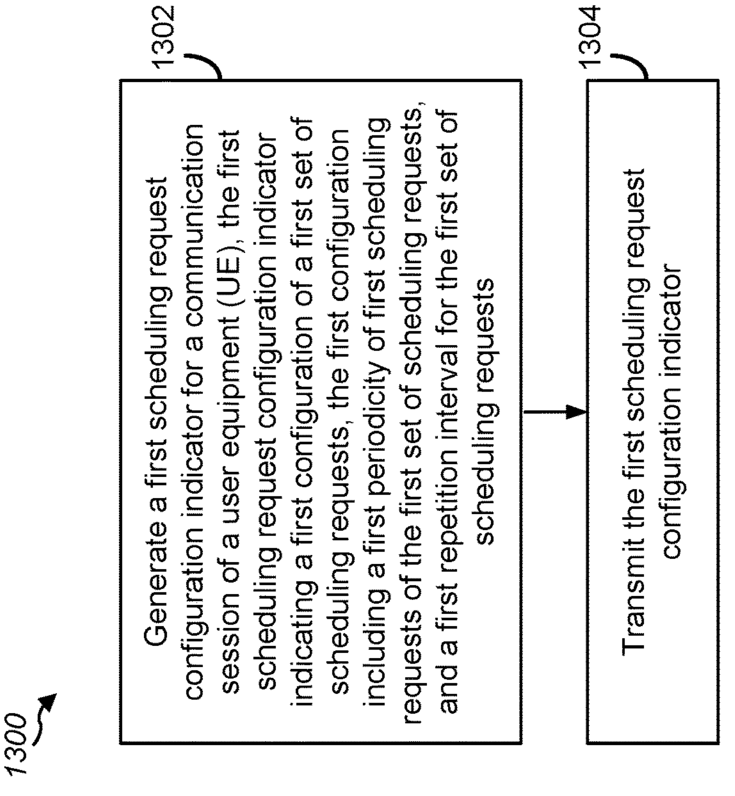
FIG. 13 is a flow diagram illustrating an example process that supports a transmission configuration according to one or more aspects.

FIG. 13 is a flow diagram illustrating an example process 1300 that supports a transmission configuration according to one or more aspects. Operations of process 1300 may be performed by base station, such as base station 105, a UE, such as UE 115, or a network entity as described above with reference to FIG. 15. For example, example operations of process 1300 may enable base station 105 to support a transmission configuration.

At block 1302, the base station generates a first scheduling request configuration indicator for a communication session of a UE. For example, the first scheduling request configuration indicator may include or correspond to first transmission configuration indicator 370. The UE may include or correspond to UE 115. The first scheduling request configuration indicator may indicate a first configuration of a first set of scheduling requests, and a first repetition interval for the first set of scheduling requests. In some implementations, the first repetition interval indicates a time period between consecutive transmissions of the first set of scheduling requests or a cyclic repetition of a start of the first set of scheduling request. The first configuration may include a first periodicity of first scheduling requests of the first set of scheduling requests. In some implementations, the first scheduling requests may be associated with a first scheduling request resource. The first configuration may include or correspond to transmission configuration information 307 or 364. The first repetition interval may include or correspond to interval 308 or 366. The first periodicity may include or correspond to periodicity 309 or 367.

The communication session may be established between the UE and a network entity. For example, the network entity may include or correspond to network node 170. In some implementations, the UE establishes the communication with the network entity via a network, such as wireless communication network 100 or 300. To illustrate, the UE establishes the communication with the network entity via a base station, such as base station 105. The communication session includes an XR communication session. The XR communication may include a VR communication session, an MR communication session, or an AR communication session. In some implementations, a type of the communication session may include or correspond to traffic type 368.

At block 1304, the base station transmit the first scheduling request configuration indicator. For example, the base station may transmit the first scheduling request configuration indicator to UE 115.

In some implementations, during the communication session and based on the first configuration and the first repetition interval, the base station 105 receives a first burst of scheduling requests associated with the first set of scheduling requests. For example, the first burst of scheduling requests may include or correspond to transmission 372. After receiving the first burst of scheduling requests, the base station may receive a second burst of scheduling requests associated with the first set of scheduling requests. For example, the base station may receive the second burst based on first repetition interval.

In some implementations, the first scheduling request configuration indicator further indicates, a second configuration of the first set of scheduling requests. The second configuration including a second periodicity of second scheduling requests of the first set of scheduling requests. The second scheduling requests may be associated with a second scheduling resource. The second periodicity may include or correspond to periodicity 309 or 367. The first periodicity may be different from or the same as the second periodicity.

In some implementations, the base station generates a second scheduling request configuration indicator, such as a second scheduling request configuration indicator for the communication session. For example, the second scheduling request configuration indicator may include or correspond to second transmission configuration indicator 376. The second scheduling request configuration indicator may indicate a third configuration of a second set of scheduling requests, and a second repetition interval for the second set of scheduling requests. The third configuration may include a third periodicity of third scheduling requests of the second set of scheduling requests. For example, the second repetition interval may include or correspond to interval 308 or 366. The third periodicity may include or correspond to periodicity 309 or 367. In some implementations, the base station may transmit the second scheduling request configuration indicator. For example, the second scheduling request configuration indicator may be transmitted to UE 115. In some implementations, transmitting the second scheduling request configuration indicator includes transmitting DCI or an MAC-CE that includes the second scheduling request configuration indicator.

In some implementations, during the communication session and after transmission of the first scheduling request configuration indicator, the base station may receive, from the UE and based on the first configuration and the first repetition interval, a first burst of scheduling requests associated with the first set of scheduling requests. For example, the first burst of scheduling requests may include or correspond to transmission 372. After receiving the first burst, the base station may receive, based on the third configuration and the second repetition interval, a second burst of scheduling requests associated with the second set of scheduling requests. For example, the second burst of scheduling requests may include or correspond to transmission 372. The second burst of scheduling request is a next scheduling request burst received from the UE after the first burst of scheduling request.

In some implementations, the first repetition interval is associated with a timer. The timer may include or correspond to clock 319 or 359. Additionally, or alternatively, the first scheduling request configuration indicator may include or be included in an information element that indicates the first repetition interval.

In some implementations, the base station determines the first repetition interval based on a DRX such that transmission of the first set of scheduling requests occurs during a DRX on duration. Additionally, or alternatively, the first scheduling request configuration indicator is transmitted based on a short DRX cycle or a long DRX cycle. In some implementations, the base station may transmit an RRC configuration that includes an information element that includes the first scheduling request configuration indicator and a DRX cycle configuration indicator.

FIG. 14 is a flow diagram illustrating an example process 1400 that supports a transmission configuration according to one or more aspects. Operations of process 1400 may be performed by base station, such as base station 105, a UE, such as UE 115, or a network entity as described above with reference to FIG. 15. For example, example operations of process 1400 may enable base station 105 to support a transmission configuration.

At block 1402, the base station generates a first transmission configuration indicator for one or more transmissions during a communication session of a UE. The UE may include or correspond to UE 115. The first transmission configuration may include or correspond to transmission configuration information 307, 364 or first transmission configuration indicator 370. The first transmission configuration indicator may indicate a first configuration for a first set of transmissions. The first configuration may include a first periodicity of a first available transmission time for the first set of transmissions. Additionally, or alternatively, the first transmission configuration may indicate a first repetition interval for the first available transmission time. The first repetition interval may include or correspond to interval 308 or 366. The first periodicity may include or correspond to periodicity 309 or 367. In some implementations, the first transmission configuration indicator is a first scheduling request configuration indicator. Additionally, or alternatively, the first set of transmission may include a first set of scheduling requests. In some implementations, the communication session includes an extended reality (XR) communication session. In some implementations, one or more transmissions of the first set of transmissions includes or is associated with a scheduling request (SR), a channel sounding response (CSR) report, a sounding reference signal (SRS), configured grant (CG), a cluster (set) of data transmissions (e.g., physical uplink shared channel (PUSCH) or physical sidelink shared channel (PSSCH) transmissions), or a hybrid automatic repeat request (HARQ) acknowledgement (ACK).

In some implementations, the first transmission configuration indicator is a first scheduling request configuration indicator. Additionally, or alternatively, the first set of transmission may include or correspond to a first set of scheduling requests.

At block 1404, the base station transmits the first transmission configuration indicator. In some implementations, the first transmission configuration indicator is sent during the communication session. In some implementations, the communication session includes an extended reality (XR) communication session.

In some implementations, the base station receives a first burst of transmissions associated with the first set of transmissions. For example, the first burst of transmission may include or correspond to transmission 372. The base station may receive the first burst of transmissions during the communication session. Additionally, or alternatively, the first burst of transmission may receive based on the first configuration and the first repetition interval. In some implementations, after receiving the first burst of transmissions, the base station my receive a second burst of transmissions associated with the first set of transmissions.

In some implementations, the first transmission configuration indicator further indicates a second configuration of the first set of transmission or a second set of transmissions. The second configuration may include or indicate a second periodicity of second transmission of the first set of transmission or the second set of transmissions. The first periodicity may be different from the second periodicity. In some implementations, the first set of transmissions are associated with a first resource, such as a first antenna, a first frequency band, etc. Additionally, or alternatively, the second set of transmissions are associated with a second resource.

In some implementations, the first repetition interval indicates a cyclic repetition of a start of the first set of transmissions. Additionally, or alternatively, the first repetition interval may indicate a time period between a last transmission time of a first group of transmissions of the first set of transmissions and an initial transmission time of a second group of transmissions of the first set of transmission.

In some implementations, the base station generates a second transmission configuration indicator for the communication session. The second transmission configuration indicator may include or correspond to second transmission configuration indicator 376. The second transmission configuration indicator may include or indicate a third configuration of a third set of transmissions. The third configuration including a third periodicity of a third available transmission time for the third set of transmissions. The third periodicity may include or correspond to periodicity 309 or 367. Additionally, or alternatively, the second transmission configuration indicator may include or indicate a second repetition interval for the third available transmission time. The second repetition interval may include or correspond to 308 or 366. In some implementations, the base station transmits the second transmission configuration indicator. In some implementations, to transmit the second transmission configuration indicator, the base station may transmit downlink control information (DCI) or a medium access control-control element (MAC-CE) that includes the second transmission configuration indicator.

In some implementations, the first repetition interval is associated with a timer. The timer may include or correspond to clock 319 or 359. Additionally, or alternatively, the first transmission configuration indicator includes an information element that indicates the first repetition interval.

In some implementations, the base station determines the first repetition interval based on a discontinuous reception (DRX) such that transmission of the first set of transmissions occurs during a DRX on duration. Additionally, or alternatively, the first transmission configuration indicator may be transmitted based on a short DRX cycle or a long DRX cycle. In some implementations, to transmit the first transmission configuration indicator, the base station may transmit a radio resource control (RRC) configuration that includes an information element that includes the first transmission configuration indicator and a DRX cycle configuration indicator.

In some implementations, the first set of transmissions include a scheduling request or a sounding reference signal. Additionally, or alternatively, the first set of transmissions may include or be associated with one or more uplink transmissions or one or more sidelink transmissions. In some implementations, transmissions of the first set of transmissions are periodic or aperiodic.

In some implementations, the base station receives a traffic indicator from the UE. For example, the traffic indicator may include or correspond to traffic information 310 or 368, or traffic type 369. The traffic indicator may be included in at least one of an L1 indication, an L2 indication, or an L3 indication, or multiplexed or piggybacked with the L1 indication, the L2 indication, or the L3 indication. The traffic indicator may indicate, for the first set of transmissions, a start time for the first set of transmissions, a transmission time period associated with the first set of transmissions, an end time for the first set of transmissions, an extension from the end time for the first set of transmissions, a traffic type of traffic of the communication session, a start time of the traffic, an expect time period of the traffic, an end time for the traffic, an extension from the end time for the traffic, or a combination thereof. Additionally, or alternatively, one or more transmissions of the first set of transmissions include an SR, a CSR/CSI report, an SRS, a CG, one or more of burst data transmissions, or an HARQ ACK.

In some implementations, the base station receives a capability indicator of the UE. For example, the capability indicator may include or correspond to capability 311. The capability indicator may include or indicate an energy harvesting capability of the UE. The energy harvesting capability may include or correspond to energy harvesting circuitry 320. The capability indicator may be included in at least one of an L1 indication, an L2 indication, or an L3 indication, or multiplexed or piggybacked with the L1 indication, the L2 indication, or the L3 indication. In some implementations, the capability indicator indicates energy information that indicates an energy harvesting capability of the UE, the energy harvesting capability includes a charging rate profile value, an energy state profile value, an energy discharging rate profile value, or a combination thereof. Additionally, or alternatively, the capability indicator indicates a start time for the energy information, an expiry/end time for the energy information, an extension from the end/expiry time for the energy information, an indication of an end of use of the energy information, or a combination thereof. In some implementations, the base station generates the first transmission configuration indicator based on the capability indicator.

In some implementations, the base station transmits at least one of an energy signal or a data/control signal to a ZP-IoT device or passive device of the UE. The ZP-IOT device or the passive device may be in an active state for energy harvesting during at least one of an RRC idle state, RRC inactive, RRC connected mode, RRC sleep mode a power saving mode, or a sleep mode of the UE. In some aspects, power saving mode is associated with turning off at least one or more of radio-frequency (RF), antenna elements, transmit or receive RF chains, hardware (HW) components, software (SW) components, or firmware (FW) components, or storage unit/battery.

FIG. 15 is a block diagram of an example network entity 1500 that supports a transmission configuration according to one or more aspects. Network entity 1500 may be configured to perform operations, including the blocks of a process described with reference to FIG. 13 or 14. In some implementations, network entity 1500 includes the structure, hardware, and components shown and described with reference to base station 105 or UE 115. For example, network entity 1500 may include controller 240, which operates to execute logic or computer instructions stored in memory 242, as well as controlling the components of network entity 1500 that provide the features and functionality of network entity 1500. Network entity 1500, under control of controller 240, transmits and receives signals via wireless radios 1501*a-t* and antennas 234*a-t*. Wireless radios 1501*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include transmission configuration information 1502 and transmission configuration logic 1503. Transmission configuration information 1502 may include or correspond to transmission configuration information 307 or 364, interval 308 or 366, periodicity 390 or 367, or traffic type 368. Transmission configuration logic 1503 may be configured to enable communication between network entity 1500 and one or more other devices based on transmission configuration information 1503. For example, transmission configuration logic 1503 may be figured to enable network entity 1500 to generate or transmit an indicator of a transmission configuration, receive one or more transmissions, or a combination thereof. The indicator of the transmission configuration may include or correspond to first transmission configuration indicator 370 or second transmission configuration indicator 376. Network entity 1500 may receive signals from or transmit signals to one or more UEs, such as UE 115 of FIGS. 1-3 or UE 1200 of FIG. 12.

Although FIGS. 3-16 have been described with reference to an XR communication session, the presents disclosure is not to be understood as being limited to an XR communication session. For example, UE 115 may establish a communication session with base station 105 or with network node 170. In some implementations, traffic of the communication session may include or be associated with one or more traffic characteristics as described with reference to XR traffic. Based on the communication session (e.g., a type of the communication session) or data communicated during the communication session, the base station 105 (or the network node 170) may determine or generate a transmission configuration to be applied by UE 115, base station 105, network node 170, or a combination thereof.

It is noted that one or more blocks (or operations) described with reference to FIG. 10, 11, 13, or 14 may be combined with one or more blocks (or operations) described with reference to another of the figures. For example, one or more blocks (or operations) of FIG. 10 may be combined with one or more blocks (or operations) of FIG. 13. As another example, one or more blocks associated with FIG. 11 may be combined with one or more blocks (or operations) associated with FIGS. 1-3 or one or more operations described with reference to FIG. 4-9. As another example, one or more blocks associated with FIG. 11 may be combined with one or more blocks (or operations) associated with FIGS. 1-3 or one or more operations described with reference to FIG. 4-9. Additionally, or alternatively, one or more operations described above with reference to FIGS. 1-3 or one or more operations described with reference to FIGS. 4-9 may be combined with one or more operations described with reference to FIG. 12 or 15.

In one or more aspects, techniques for supporting a transmission configuration may include additional aspects, such as any single aspect or any combination of aspects described below or in connection with one or more other processes or devices described elsewhere herein. In a first aspect, techniques for supporting a transmission configuration may include establishing a communication session with a network entity. The techniques may further include receiving a first scheduling request configuration indicator for the communication session. The first scheduling request configuration indicator indicates a first configuration of a first set of scheduling requests, and a first repetition interval for the first set of scheduling requests. The first configuration includes a first periodicity of first scheduling requests of the first set of scheduling requests. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the communication session includes an XR communication session.

In a third aspect, in combination with the second aspect, the XR communication includes a VR communication session, an MR communication session, or an AR communication session.

In a fourth aspect, in combination with one or more of the first aspect through the third aspect, the techniques further include, during the communication session and based on the first configuration and the first repetition interval, transmitting a first burst of scheduling requests associated with the first set of scheduling requests.

In a fifth aspect in combination with the fourth aspect, the techniques further include, during the communication session and based on the first configuration and the first repetition interval, after transmitting the first burst of scheduling requests, transmitting a second burst of scheduling requests associated with the first set of scheduling requests.

In a sixth aspect, in combination with the third aspect, the first scheduling request configuration indicator further indicates a second configuration of the first set of scheduling requests.

In a seventh aspect, in combination with the sixth aspect, the second configuration includes a second periodicity of second scheduling requests of the first set of scheduling requests.

In an eighth aspect, in combination with the seventh aspect, the first periodicity is different from the second periodicity.

In a ninth aspect, in combination with the eighth aspect, the first scheduling requests are associated with a first scheduling request resource.

In a tenth aspect, in combination with the ninth aspect, the second scheduling requests are associated with a second scheduling resource.

In an eleventh aspect, in combination with the tenth aspect, the first repetition interval indicates a time period between consecutive transmissions of the first set of scheduling requests or a cyclic repetition of a start of the first set of scheduling request.

In a twelfth aspect, in combination with one or more of the first aspect through the third aspect, the techniques further include receiving a second scheduling request configuration indicator for the communication session.

In a thirteenth aspect, in combination with the twelfth aspect, the second scheduling request configuration indicator indicates a third configuration of a second set of scheduling requests.

In a fourteenth aspect, in combination with the thirteenth aspect, the third configuration includes a third periodicity of third scheduling requests of the second set of scheduling requests.

In a fifteenth aspect, in combination with the fourteenth aspect, a second repetition interval for the second set of scheduling requests.

In a sixteenth aspect, in combination with the fifteenth aspect, the techniques further include, during the communication session: after receiving the first scheduling request configuration indicator, transmitting, based on the first configuration and the first repetition interval, a first burst of scheduling requests associated with the first set of scheduling requests.

In a seventeenth aspect, in combination with the sixteenth aspect, the techniques further include, during the communication session: after transmitting the first burst, receiving, based on the third configuration and the second repetition interval, a second burst of scheduling requests associated with the second set of scheduling requests, In an eighteenth aspect, in combination the seventeenth aspect, the second burst of scheduling request is a next scheduling request burst received from the UE after the first burst of scheduling request.

In a nineteenth aspect, in combination with the fifteenth aspect, the techniques for receiving the second scheduling request configuration indicator further include receiving DCI or an MAC-CE that includes the second scheduling request configuration indicator.

In a twentieth aspect, in combination with one or more of the first aspect through the third aspect, the first repetition interval is associated with a timer, the first scheduling request configuration indicator includes an information element that indicates the first repetition interval, or a combination thereof.

In a twenty-first aspect, in combination with one or more of the first aspect through the third aspect, the first repetition interval is based on a DRX such that transmission of the first set of scheduling requests occurs during a DRX on duration.

In a twenty-second aspect, in combination with the twenty-first aspect, the first scheduling request configuration indicator is received based on a short DRX cycle or a long DRX cycle.

In a twenty-third aspect, in combination with the twenty-first aspect or the twenty-second aspect, the techniques for receiving the first scheduling request configuration indicator further include receiving a RRC configuration that includes an information element that includes the first scheduling request configuration indicator and a DRX cycle configuration indicator.

In one or more aspects, techniques for supporting a transmission configuration may include additional aspects, such as any single aspect or any combination of aspects described below or in connection with one or more other processes or devices described elsewhere herein. In a twenty-fourth aspect, techniques for supporting a transmission configuration may include generating a first scheduling request configuration indicator for a communication session of a UE. The first scheduling request configuration indicator indicates a first configuration of a first set of scheduling requests, and a first repetition interval for the first set of scheduling requests. The first configuration includes a first periodicity of first scheduling requests of the first set of scheduling requests. The techniques may further include transmitting the first scheduling request configuration indicator. In some examples, the techniques in the twenty-fourth aspect may be implemented in a method or process. In some other examples, the techniques of the twenty-fourth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a twenty-fifth aspect, in combination the twenty-fourth aspect, wherein the communication session includes an XR communication session.

In a twenty-sixth aspect, in combination with the twenty-fourth aspect or the twenty-fifth aspect, the XR communication includes a VR communication session, an MR communication session, or an AR communication session.

In a twenty-seventh aspect, in combination with one or more of the twenty-fourth aspect through the twenty-sixth aspect, the techniques further include, during the communication session and based on the first configuration and the first repetition interval: receiving a first burst of scheduling requests associated with the first set of scheduling requests.

In a twenty-eighth aspect, in combination with the twenty-seventh aspect, the techniques further include, during the communication session and based on the first configuration and the first repetition interval: after receiving the first burst of scheduling requests, receiving a second burst of scheduling requests associated with the first set of scheduling requests.

In a twenty-ninth aspect, in combination with one or more of the twenty-fourth aspect through the twenty-sixth aspect, the first scheduling request configuration indicator further indicates, a second configuration of the first set of scheduling requests, the second configuration including a second periodicity of second scheduling requests of the first set of scheduling requests.

In a thirtieth aspect, in combination with the twenty-ninth aspect, the first periodicity is different from the second periodicity.

In a thirty-first aspect, in combination with the thirtieth aspect, the first scheduling requests are associated with a first scheduling request resource.

In a thirty-second aspect, in combination with the thirty-first aspect, the second scheduling requests are associated with a second scheduling resource.

In a thirty-third aspect, in combination with the thirty-second aspect, the first repetition interval indicates a time period between consecutive transmissions of the first set of scheduling requests or a cyclic repetition of a start of the first set of scheduling request.

In a thirty-fourth aspect, in combination with one or more of the twenty-fourth aspect through the twenty-sixth aspect, the techniques further include generating a second scheduling request configuration indicator for the communication session. 5. The method of claim 1, further comprising:

In a thirty-fifth aspect, in combination with the thirty-fourth aspect, the second scheduling request configuration indicator indicates a third configuration of a second set of scheduling requests, and a second repetition interval for the second set of scheduling requests.

In a thirty-sixth aspect, in combination with the thirty-fifth aspect, the third configuration including a third periodicity of third scheduling requests of the second set of scheduling requests.

In a thirty-seventh aspect, in combination with the thirty-sixth aspect, the techniques further include transmitting the second scheduling request configuration indicator.

In a thirty-eighth aspect, in combination with the thirty-seventh aspect, the techniques further include, during the communication session and after transmitting the first scheduling request configuration indicator, receiving, from the UE based on the first configuration and the first repetition interval, a first burst of scheduling requests associated with the first set of scheduling requests.

In a thirty-ninth aspect, in combination with one or more of the twenty-fourth aspect through the thirty-eighth aspect, the techniques further include, during the communication session and after receiving the first burst, receiving, based on the third configuration and the second repetition interval, a second burst of scheduling requests associated with the second set of scheduling requests.

In a fortieth aspect, in combination with one or more of the twenty-fourth aspect through the thirty-ninth aspect, the second burst of scheduling request is a next scheduling request burst received from the UE after the first burst of scheduling request.

In a forty-first aspect, in combination with the thirty-seventh aspect, the techniques for transmitting the second scheduling request configuration indicator include transmitting DCI or an MAC-CE that includes the second scheduling request configuration indicator.

In a forty-second aspect, in combination with one or more of the twenty-fourth aspect through the twenty-sixth aspect, the first repetition interval is associated with a timer, the first scheduling request configuration indicator includes an information element that indicates the first repetition interval, or a combination thereof.

In a forty-third aspect, in combination with one or more of the twenty-fourth aspect through the twenty-sixth aspect, the techniques further include determining the first repetition interval based on a DRX such that transmission of the first set of scheduling requests occurs during a DRX on duration.

In a forty-fourth aspect, in combination the forty-third aspect, the first scheduling request configuration indicator is transmitted based on a short DRX cycle or a long DRX cycle.

In a forty-fifth aspect, in combination with the forty-fourth aspect, the techniques for transmitting the first scheduling request configuration indicator include transmitting a RRC configuration that includes an information element that includes the first scheduling request configuration indicator and a DRX cycle configuration indicator.

In one or more aspects, techniques for supporting a transmission configuration may include additional aspects, such as any single aspect or any combination of aspects described below or in connection with one or more other processes or devices described elsewhere herein. In a forty-sixth aspect, techniques for supporting a transmission configuration may include receiving a first transmission configuration indicator for one or more transmissions associated with a communication session. The first transmission configuration indicator indicates a first configuration for a first set of transmissions. The first configuration includes a first periodicity of a first available transmission time for the first set of transmissions. The first transmission configuration indicator also indicates a first repetition interval for the first available transmission time. The techniques may further include initiating at least one transmission of the first set of transmissions based on the first transmission configuration indicator. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a forty-seventh aspect, in combination with the forty-sixth aspect, the first transmission configuration indicator is a first scheduling request configuration indicator.

In a forty-eighth aspect, in combination with the forty-seventh aspect, the first set of transmission includes a first set of scheduling requests.

In a forty-ninth aspect, in combination with the forty-eighth aspect, the techniques further include, during the communication session and based on the first configuration and the first repetition interval, transmitting a first burst of transmission associated with the first set of transmission.

In a fiftieth aspect, in combination with the forty-ninth aspect, the techniques further include, during the communication session and based on the first configuration and the first repetition interval and after transmitting the first burst of transmission, transmitting a second burst of transmission associated with the first set of transmission.

In a fifty-first aspect, in combination with one or more of the forty-sixth aspect through the fiftieth aspect, the communication session includes an XR communication session.

In a fifty-second aspect, in combination with one or more of the forty-sixth aspect through the fifty-first aspect, the first transmission configuration indicator further indicates a second configuration of the first set of transmission or a second set of transmissions.

In a fifty-third aspect, in combination with the fifty-second aspect, the second configuration includes a second periodicity of second transmission of the first set of transmission or the second set of transmissions.

In a fifty-fourth aspect, in combination with one or more of the forty-sixth aspect through the fifty-third aspect, the techniques further include receiving a second transmission configuration indicator for the communication session.

In a fifty-fifth aspect, in combination with the fifty-fourth aspect, the second transmission configuration indicator indicates a third configuration of a second set of transmissions, the third configuration including a third periodicity of a third set of transmissions of the second set of transmissions.

In a fifty-sixth aspect, in combination with the fifty-fifth aspect, the second transmission configuration indicator indicates a second repetition interval for the second set of transmission.

In a fifty-seventh aspect, in combination with one or more of the forty-sixth aspect through the fifty-sixth aspect, the techniques further include, during the communication session, after receiving the first transmission configuration indicator, transmitting, based on the first configuration and the first repetition interval, a first burst of transmissions associated with the first set of transmissions.

In a fifty-eighth aspect, in combination with the fifty-seventh aspect, the techniques further include, during the communication session, after transmitting the first burst of transmissions, transmitting, based on the third configuration and the second repetition interval, a second burst of transmissions associated with the second set of transmissions.

In a fifty-ninth aspect, in combination with one or more of the forty-sixth aspect through the fifty-eighth aspect, the first repetition interval is based on a DRX such that transmission of the first set of transmissions occurs during a DRX on duration.

In a sixtieth aspect, in combination with the fifty-ninth aspect, the first transmission configuration indicator is received based on a short DRX cycle or a long DRX cycle.

In a sixty-first aspect, in combination with one or more of the forty-sixth aspect through the sixtieth aspect, the techniques further include receiving the first transmission configuration indicator includes receiving an RRC configuration that includes an information element that includes the first transmission configuration indicator and a DRX cycle configuration indicator.

In a sixty-second aspect, in combination with one or more of the forty-sixth aspect through the sixty-first aspect, the first set of transmissions include a scheduling request or a sounding reference signal.

In a sixty-third aspect, in combination with one or more of the forty-sixth aspect or the sixty-second aspect, the first set of transmissions include one or more uplink transmissions or one or more sidelink transmissions.

In a sixty-fourth aspect, in combination with the sixty-second aspect or the sixty-third aspect, transmissions of the first set of transmissions are periodic or aperiodic.

In a sixty-fifth aspect, in combination with one or more of the forty-sixth aspect through the sixty-fourth aspect, the techniques further include transmitting a traffic indicator from the UE.

In a sixty-sixth aspect, in combination with the sixty-fifth aspect, the traffic indicator is included in at least one of an L1 indication, an L2 indication, or an L3 indication, or multiplexed or piggybacked with the L1 indication, the L2 indication, or the L3 indication.

In a sixty-seventh aspect, in combination with the sixty-fifth aspect or the sixty-sixth aspect, the traffic indicator indicates, for the first set of transmissions, a start time for the first set of transmissions, a transmission time period associated with the first set of transmissions, an end time for the first set of transmissions, an extension from the end time for the first set of transmissions, a traffic type of traffic of the communication session, a start time of the traffic, an expected time period of the traffic, an end time for the traffic, an extension from the end time for the traffic, or a combination thereof.

In a sixty-eighth aspect, in combination with one or more of the forty-sixth aspect through the sixty-seventh aspect, one or more transmissions of the first set of transmissions include an SR, a CSR/CSI report, an SRS, a CG, one or more of burst data transmissions, or an HARQ ACK.

In a sixty-ninth aspect, in combination with one or more of the forty-sixth aspect through the sixty-eighth aspect, the techniques further include generating a capability indicator of a capability of the UE.

In a seventieth aspect, in combination with the sixty-ninth aspect, wherein the capability indicator is included in at least one of an L1 indication, an L2 indication, or an L3 indication, or multiplexed or piggybacked with the L1 indication, the L2 indication, or the L3 indication.

In a seventy-first aspect, in combination with the seventieth aspect, the capability indicator indicates energy information that indicates an energy harvesting capability of the UE, the energy harvesting capability includes a charging rate profile value, an energy state profile value, an energy discharging rate profile value, or a combination thereof.

In a seventy-second aspect, in combination with o the seventy-first aspect, the capability indicator indicates a start time for the energy information, an expiry/end time of the energy information, an extension from the end/expiry time for the energy information, an indication of an end of use of the energy information, or a combination thereof.

In a seventy-third aspect, in combination with one or more of the sixty-ninth aspect through the seventy-second aspect, the techniques further include transmitting the capability indicator.

In a seventy-fourth aspect, in combination with one or more of the forty-sixth aspect through the seventy-third aspect, the techniques further include selecting, based on a capability of the UE, a transmission configuration of multiple transmission configurations.

In a seventy-fifth aspect, in combination with the seventy-fourth aspect, the techniques further include transmitting a request for the selected transmission configuration.

In a seventy-sixth aspect, in combination with one or more of the forty-sixth aspect through the seventy-fifth aspect, the techniques further include activating a ZP-IOT device or a passive device of the UE for energy harvesting during at least one of an RRC idle state, RRC inactive, RRC connected, a power saving mode, or a sleep mode.

In a seventy-seventh aspect, in combination with the seventy-sixth aspect, the techniques further include receiving at least one of an energy signal or a data signal, from the network entity, via the ZP-IoT device or the passive device to harvest energy.

In one or more aspects, techniques for supporting a transmission configuration may include additional aspects, such as any single aspect or any combination of aspects described below or in connection with one or more other processes or devices described elsewhere herein. In a seventy-eighth aspect, techniques for supporting a transmission configuration may include generating a first transmission configuration indicator for one or more transmissions during a communication session of a UE. The first transmission configuration indicator indicates a first configuration for a first set of transmissions. The first configuration includes a first periodicity of a first available transmission time for the first set of transmissions, and a first repetition interval for the first available transmission time. The techniques may further include transmitting the first transmission configuration indicator. In some examples, the techniques in the seventy-eighth aspect may be implemented in a method or process. In some other examples, the techniques of the seventy-eighth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a seventy-ninth aspect, in combination with the seventy-eighth aspect, the first transmission configuration indicator is a first scheduling request configuration indicator.

In an eightieth aspect, in combination with the seventy-eighth aspect or the seventy-ninth aspect, the first set of transmission includes a first set of scheduling requests.

In an eighty-first aspect, in combination with one or more of the seventy-eighth aspect through the eightieth aspect, the techniques further include, during the communication session and based on the first configuration and the first repetition interval, receiving a first burst of transmissions associated with the first set of transmissions.

In an eighty-second aspect, in combination with the eighty-first aspect, the techniques further include, during the communication session and based on the first configuration and the first repetition interval: after receiving the first burst of transmissions, receiving a second burst of transmissions associated with the first set of transmissions.

In an eighty-third aspect, in combination with the eighty-second aspect, the communication session includes an XR communication session.

In an eighty-fourth aspect, in combination with one or more of the seventy-eighth aspect through the eighty-third aspect, the first transmission configuration indicator further indicates, a second configuration of the first set of transmission or a second set of transmissions, the second configuration including a second periodicity of a second available transmission time for the first set of transmissions or the second set of transmissions.

In an eighty-fifth aspect, in combination with the eighty-fourth aspect, the first periodicity is different from the second periodicity; the first set of transmissions are associated with a first resource; the second set of transmissions are associated with a second resource; or a combination thereof.

In an eighty-sixth aspect, in combination with the eighty-fifth aspect, the first repetition interval indicates a cyclic repetition of a start of the first set of transmissions, or a time period between a last transmission time of a first group of transmissions of the first set of transmissions and an initial transmission time of a second group of transmissions of the first set of transmission.

In an eighty-seventh aspect, in combination with one or more of the seventy-eighth aspect through the eighty-sixth aspect, the techniques further include generating a second transmission configuration indicator for the communication session, the second transmission configuration indicator indicating: a third configuration of a third set of transmissions, the third configuration including a third periodicity of a third available transmission time for the third set of transmissions; and a second repetition interval for the third available transmission time.

In an eighty-eighth aspect, in combination with the eighty-seventh aspect, further comprising the techniques further include transmitting the second transmission configuration indicator.

In an eighty-ninth aspect, in combination with the eighty-eighth aspect, the first repetition interval is associated with a timer, the first transmission configuration indicator includes an information element that indicates the first repetition interval, or a combination thereof.

In a ninetieth aspect, in combination with the eighty-ninth aspect, to transmit the second transmission configuration, the techniques further include indicator includes transmitting DCI or an MAC-CE that includes the second transmission configuration indicator.

In a ninety-first aspect, in combination with one or more of the seventy-eighth aspect through the ninetieth aspect, the first set of transmissions include a scheduling request or a sounding reference signal, the first set of transmissions include one or more uplink transmissions or one or more sidelink transmissions, transmissions of the first set of transmissions are periodic or aperiodic, or a combination thereof.

In a ninety-second aspect, in combination with one or more of the seventy-eighth aspect through the ninety-first aspect, the techniques further include determining the first repetition interval based on a DRX such that transmission of the first set of transmissions occurs during a DRX on duration.

In a ninety-third aspect, in combination with the ninety-second aspect, the first transmission configuration indicator is transmitted based on a short DRX cycle or a long DRX cycle.

In a ninety-fourth aspect, in combination with one or more of the seventy-eighth aspect through the ninety-third aspect, to transmit the first transmission configuration indicator, the techniques further include transmitting an RRC configuration that includes an information element that includes the first transmission configuration indicator and a DRX cycle configuration indicator.

In a ninety-fifth aspect, in combination with one or more of the seventy-eighth aspect through the ninety-fourth aspect, the techniques further include transmitting at least one of an energy signal or a data signal to a ZP-IoT device or passive device of the UE.

In a ninety-sixth aspect, in combination with the ninety-fifth aspect, the ZP-IOT device or the passive device is in an active state for energy harvesting during at least one of an RRC idle state, RRC inactive, RRC connected, a power saving mode, or a sleep mode of the UE.

In a ninety-seventh aspect, in combination with one or more of the seventy-eighth aspect through the ninety-sixth aspect, the techniques further include receiving a traffic indicator from the UE.

In a ninety-eighth aspect, in combination with the ninety-seventh aspect, the traffic indicator is included in at least one of an L1 indication, an L2 indication, or an L3 indication, or multiplexed or piggybacked with the L1 indication, the L2 indication, or the L3 indication.

In a ninety-ninth aspect, in combination with the ninety-seventh aspect or the ninety-eighth aspect, the traffic indicator indicates, for the first set of transmissions, a start time for the first set of transmissions, a transmission time period associated with the first set of transmissions, an end time for the first set of transmissions, an extension from the end time for the first set of transmissions, a traffic type of traffic of the communication session, a start time of the traffic, an expect time period of the traffic, an end time for the traffic, an extension from the end time for the traffic, or a combination thereof.

In a one hundredth aspect, in combination with one or more of the seventy-eighth aspect through the ninety-ninth aspect, one or more transmissions of the first set of transmissions include an SR, a CSR/CSI report, an SRS, a CG, one or more of burst data transmissions, or an HARQ ACK.

In a one hundred and first aspect, in combination with one or more of the seventy-eighth aspect through the one hundredth aspect, the techniques further include receiving a capability indicator of the UE.

In a one hundred and second aspect, in combination with the one hundred and first aspect, the capability indicator is included in at least one of an L1 indication, an L2 indication, or an L3 indication, or multiplexed or piggybacked with the L1 indication, the L2 indication, or the L3 indication.

In a one hundred and third aspect, in combination with the one hundred and first aspect or the one hundred and second aspect, the capability indicator indicates energy information that indicates an energy harvesting capability of the UE, the energy harvesting capability includes a charging rate profile value, an energy state profile value, an energy discharging rate profile value, or a combination thereof.

In a one hundred and fourth aspect, in combination with the one hundred and third aspect, the capability indicator indicates a start time for the energy information, an expiry/end time for the energy information, an extension from the end/expiry time for the energy information, an indication of an end of use of the energy information, or a combination thereof.

In a one hundred and fifth aspect, in combination with one or more of the one hundred and first aspect through the one hundred and fourth aspect, the techniques further include generating the first transmission configuration indicator based on the capability indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network entity, the method comprising:

generating a first transmission configuration indicator configured as a scheduling request configuration indicator for one or more transmissions during a communication session of a user equipment (UE), the one or more transmissions by the UE, wherein the first transmission configuration indicator indicates:

a first configuration for a first set of transmissions, the first configuration including a first periodicity of a first available transmission time for the first set of transmissions; and a first repetition interval for the first available transmission time; and transmitting the first transmission configuration indicator.

2. The method of claim 1, wherein:

the first transmission configuration indicator is a first scheduling request configuration indicator; and the first set of transmission includes a first set of scheduling requests.

3. The method of claim 1, further comprising, during the communication session and based on the first configuration and the first repetition interval:

receiving a first burst of transmissions associated with the first set of transmissions; and after receiving the first burst of transmissions, receiving a second burst of transmissions associated with the first set of transmissions, wherein the communication session includes an extended reality (XR) communication session.

4. The method of claim 1, wherein the first transmission configuration indicator further indicates, a second configuration of the first set of transmission or a second set of transmissions, the second configuration including a second periodicity of a second available transmission time for the first set of transmissions or the second set of transmissions.

5. The method of claim 4, wherein:

the first periodicity is different from the second periodicity;

the first set of transmissions are associated with a first resource;

the second set of transmissions are associated with a second resource; or the first repetition interval indicates:

a cyclic repetition of a start of the first set of transmissions; or a time period between a last transmission time of a first group of transmissions of the first set of transmissions and an initial transmission time of a second group of transmissions of the first set of transmission.

6. The method of claim 1, further comprising:

generating a second transmission configuration indicator for the communication session, the second transmission configuration indicator indicating:

a third configuration of a third set of transmissions, the third configuration including a third periodicity of a third available transmission time for the third set of transmissions; and a second repetition interval for the third available transmission time; and transmitting the second transmission configuration indicator.

7. The method of claim 6, wherein:

the first repetition interval is associated with a timer, the first transmission configuration indicator includes an information element that indicates the first repetition interval, or a combination thereof;

transmitting the second transmission configuration indicator includes transmitting downlink control information (DCI) or a medium access control-control element (MAC-CE) that includes the second transmission configuration indicator;

the first set of transmissions include a scheduling request or a sounding reference signal;

the first set of transmissions include one or more uplink transmissions or one or more sidelink transmissions;

transmissions of the first set of transmissions are periodic or aperiodic; or a combination thereof.

8. The method of claim 1, further comprising:

determining the first repetition interval based on a discontinuous reception (DRX) such that transmission of the first set of transmissions occurs during a DRX on duration, and wherein the first transmission configuration indicator is transmitted based on a short DRX cycle or a long DRX cycle.

9. The method of claim 8, wherein transmitting the first transmission configuration indicator includes transmitting a radio resource control (RRC) configuration that includes an information element that includes the first transmission configuration indicator and a DRX cycle configuration indicator.

10. The method of claim 1, further comprising:

transmitting at least one of an energy signal or a data signal to a zero power-Internet-of-Things (ZP-IoT) device or passive device of the UE, and wherein the ZP-IoT device or the passive device is in an active state for energy harvesting during at least one of a radio resource control (RRC) idle state, an RRC inactive state, an RRC connected mode, a power saving mode, or a sleep mode of the UE.

11. The method of claim 1, further comprising:

receiving a traffic indicator from the UE, wherein the traffic indicator is:

included in at least one of a Layer 1 (L1) indication, a Layer 2 (L2) indication, or a Layer 3 (L3) indication, or multiplexed or piggybacked with the L1 indication, the L2 indication, or the L3 indication;

wherein the traffic indicator indicates, for the first set of transmissions:

a start time for the first set of transmissions;

a transmission time period associated with the first set of transmissions;

an end time for the first set of transmissions;

an extension from the end time for the first set of transmissions;

a traffic type of traffic of the communication session;

a start time of the traffic;

an expect time period of the traffic;

an end time for the traffic;

an extension from the end time for the traffic; or a combination thereof, and wherein one or more transmissions of the first set of transmissions include a scheduling request (SR), a channel sounding response/information (CSR/CSI) report, a sounding reference signal (SRS), a configured grant (CG), one or more of burst data transmissions, or a hybrid automatic repeat request (HARQ) acknowledgement (ACK).

12. The method of claim 1, further comprising:

receiving a capability indicator of the UE, wherein the capability indicator is:

included in at least one of a Layer 1 (L1) indication, a Layer 2 (L2) indication, or a Layer 3 (L3) indication; or multiplexed or piggybacked with the L1 indication, the L2 indication, or the L3 indication;

wherein the capability indicator indicates:

energy information that indicates an energy harvesting capability of the UE, the energy harvesting capability includes a charging rate profile value, an energy state profile value, an energy discharging rate profile value, or a combination thereof; and a start time for the energy information;

an expiry/end time for the energy information;

an extension from the end/expiry time for the energy information;

an indication of an end of use of the energy information; or a combination thereof; and generating the first transmission configuration indicator based on the capability indicator.

13. A network entity comprising:

at least one processor coupled to a memory storing processor-readable code, the at least one processor configured to execute the processor-readable code to cause the at least one processor to generate a first transmission configuration indicator configured as a scheduling request configuration indicator for one or more transmissions during a communication session of a user equipment (UE), the one or more transmissions by the UE, wherein the first transmission configuration indicator indicates:

a first configuration for a first set of transmissions, the first configuration including a first periodicity of a first available transmission time for the first set of transmissions; and a first repetition interval for the first available transmission time; and a communication interface configured to transmit the first transmission configuration indicator.

14. The network entity of claim 13, wherein:

one or more transmissions of the first set of transmissions include a scheduling request (SR), a channel sounding response (CSR) report, a channel sounding information (CSI) report, a sounding reference signal (SRS), a configured grant (CG), one or more of burst data transmissions, or a hybrid automatic repeat request (HARQ) acknowledgement (ACK);

the first set of transmissions include one or more uplink transmissions or one or more sidelink transmissions;

transmissions of the first set of transmissions are periodic or aperiodic; or a combination thereof.

15. The network entity of claim 13, wherein:

the at least one processor is configured to execute the processor-readable code to cause the at least one processor to:

determine the first repetition interval based on a discontinuous reception (DRX) such that transmission of the first set of transmissions occurs during a DRX on duration;

generate a radio resource control (RRC) configuration that includes an information element that includes the first transmission configuration indicator and a DRX cycle configuration indicator; and the communication interface is further configured to transmit the RRC configuration based on a short DRX cycle or a long DRX cycle.

16. A method of wireless communication performed by a user equipment (UE), the method comprising:

receiving a first transmission configuration indicator configured as a scheduling request configuration indicator for one or more transmissions associated with a communication session, the one or more transmissions by the UE, wherein the first transmission configuration indicator indicates:

a first configuration for a first set of transmissions, the first configuration including a first periodicity of a first available transmission time for the first set of transmissions; and a first repetition interval for the first available transmission time; and initiating at least one transmission of the first set of transmissions based on the first transmission configuration indicator.

17. The method of claim 16, wherein:

the first transmission configuration indicator is a first scheduling request configuration indicator; and the first set of transmission includes a first set of scheduling requests.

18. The method of claim 16, further comprising, during the communication session and based on the first configuration and the first repetition interval:

transmitting a first burst of transmission associated with the first set of transmission; and after transmitting the first burst of transmission, transmitting a second burst of transmission associated with the first set of transmission, wherein the communication session includes an extended reality (XR) communication session.

19. The method of claim 16, wherein the first transmission configuration indicator further indicates a second configuration of the first set of transmission or a second set of transmissions, the second configuration including a second periodicity of second transmission of the first set of transmission or the second set of transmissions.

20. The method of claim 16, further comprising:

receiving a second transmission configuration indicator for the communication session, the second transmission configuration indicator indicating:

a third configuration of a second set of transmissions, the third configuration including a third periodicity of a third set of transmissions of the second set of transmissions; and a second repetition interval for the second set of transmissions.

21. The method of claim 20, further comprising, during the communication session:

after receiving the first transmission configuration indicator, transmitting, based on the first configuration and the first repetition interval, a first burst of transmissions associated with the first set of transmissions; and after transmitting the first burst of transmissions, transmitting, based on the third configuration and the second repetition interval, a second burst of transmissions associated with the second set of transmissions.

22. The method of claim 16, wherein:

the first repetition interval is based on a discontinuous reception (DRX) such that transmission of the first set of transmissions occurs during a DRX on duration, the first transmission configuration indicator is received based on a short DRX cycle or a long DRX cycle; and receiving the first transmission configuration indicator includes receiving a radio resource control (RRC) configuration that includes an information element that includes the first transmission configuration indicator and a DRX cycle configuration indicator.

23. The method of claim 16, wherein:

the first set of transmissions include a scheduling request or a sounding reference signal;

the first set of transmissions include one or more uplink transmissions or one or more sidelink transmissions;
transmissions of the first set of transmissions are periodic or aperiodic; or
a combination thereof.

24. The method of claim 16, further comprising:
transmitting a traffic indicator from the UE,
wherein the traffic indicator is:
included in at least one of a Layer 1 (L1) indication, a Layer 2 (L2) indication, or a Layer 3 (L3) indication, or
multiplexed or piggybacked with the L1 indication, the L2 indication, or the L3 indication,
wherein the traffic indicator indicates, for the first set of transmissions:
a start time for the first set of transmissions;
a transmission time period associated with the first set of transmissions;
an end time for the first set of transmissions;
an extension from the end time for the first set of transmissions;
a traffic type of traffic of the communication session;
a start time of the traffic;
an expected time period of the traffic;
an end time for the traffic;
an extension from the end time for the traffic; or
a combination thereof; or
wherein one or more transmissions of the first set of transmissions include a scheduling request (SR), a channel sounding response/information (CSR/CSI) report, a sounding reference signal (SRS), a configured grant (CG), one or more of burst data transmissions, or a hybrid automatic repeat request (HARQ) acknowledgement (ACK).

25. The method of claim 16, further comprising:
generating a capability indicator of a capability of the UE, and
wherein the capability indicator is:
included in at least one of a Layer 1 (L1) indication, a Layer 2 (L2) indication, or a Layer 3 (L3) indication; or
multiplexed or piggybacked with the L1 indication, the L2 indication, or the L3 indication; or
wherein the capability indicator indicates:
energy information that indicates an energy harvesting capability of the UE, the energy harvesting capability includes a charging rate profile value, an energy state profile value, an energy discharging rate profile value, or a combination thereof, and
a start time for the energy information;
an expiry/end time of the energy information;
an extension from the end/expiry time for the energy information;
an indication of an end of use of the energy information; or
a combination thereof; and
transmitting the capability indicator.

26. The method of claim 16, further comprising:
selecting, based on a capability of the UE, a transmission configuration of multiple transmission configurations; and
transmitting a request for the selected transmission configuration.

27. The method of claim 16, further comprising:
activating a zero power-Internet-of-Things (ZP-IoT) device or a passive device of the UE for energy harvesting during at least one of a radio resource control (RRC) idle state, an RRC inactive state, an RRC connected mode, RRC sleep mode, a power saving mode, or a sleep mode; and
receiving at least one of an energy signal or a data signal, from a network entity, via the ZP-IoT device or the passive device to harvest energy.

28. A user equipment (UE) comprising:
a communication interface configured to receive a first transmission configuration indicator configured as a scheduling request configuration indicator for one or more transmissions during a communication session, the one or more transmissions by the UE, wherein the first transmission configuration indicator indicates:
a first configuration for a first set of transmissions, the first configuration including a first periodicity of a first available transmission time for the first set of transmissions; and
a first repetition interval for the first available transmission time; and
at least one processor coupled to a memory storing processor-readable code, the at least one processor configured to execute the processor-readable code to cause the at least one processor to initiate at least one transmission of the first set of transmissions based on the first transmission configuration indicator.

29. The UE of claim 28, wherein:
the communication interface includes a zero power-Internet-of-Things (ZP-IOT) device or a passive device configured to be activated for energy harvesting during at least one of a radio resource control (RRC) idle state, RRC inactive, RRC connected mode, RRC sleep mode, a power saving mode, or a sleep mode; and
one or more transmissions of the first set of transmissions include a scheduling request (SR), a channel sounding response (CSR) report, a sounding reference signal (SRS), a configured grant (CG), one or more of burst data transmissions, or a hybrid automatic repeat request (HARQ) acknowledgement (ACK).

30. The UE of claim 28, wherein:
the first repetition interval is based on a discontinuous reception (DRX) such that transmission of the first set of transmissions occurs during a DRX on duration; and
the communication interface is further configured to receive, based on a short DRX cycle or a long DRX cycle, a radio resource control (RRC) configuration that includes an information element that includes the first transmission configuration indicator and a DRX cycle configuration indicator.

* * * * *